(12) United States Patent
Soto et al.

(10) Patent No.: US 8,958,697 B2
(45) Date of Patent: Feb. 17, 2015

(54) SYSTEM AND METHOD FOR OPTICAL LAYER MANAGEMENT IN OPTICAL MODULES AND REMOTE CONTROL OF OPTICAL MODULES

(76) Inventors: Alexander I. Soto, San Diego, CA (US); Walter G. Soto, San Clemente, CA (US)

(*) Notice: Subject to any disclaimer, the term of this patent is extended or adjusted under 35 U.S.C. 154(b) by 281 days.

(21) Appl. No.: 13/543,880

(22) Filed: Jul. 8, 2012

(65) Prior Publication Data
US 2012/0275784 A1 Nov. 1, 2012

Related U.S. Application Data

(63) Continuation-in-part of application No. 12/982,872, filed on Dec. 30, 2010, now Pat. No. 8,238,754, and a continuation-in-part of application No. 12/512,968, filed on Jul. 30, 2009, said application No. 12/982,872 is a continuation of application No. 10/886,514, filed on Jul. 6, 2004, now Pat. No. 7,925,162, said application No. 12/512,968 is a continuation-in-part of application No. 11/772,187, filed on Jun. 30, 2007, now abandoned, which is a continuation of application No. 10/865,547, filed on Jun. 10, 2004, now Pat. No. 7,242,868.

(60) Provisional application No. 60/485,072, filed on Jul. 3, 2003, provisional application No. 60/515,836, filed on Oct. 30, 2003, provisional application No. 60/477,845, filed on Jun. 10, 2003, provisional application No. 60/480,488, filed on Jun. 21, 2003.

(51) Int. Cl.
*H04J 14/08* (2006.01)
*H04B 10/20* (2006.01)
*H04B 10/25* (2013.01)

(52) U.S. Cl.
CPC .................. *H04B 10/2503* (2013.01)
USPC ............. 398/100; 398/58; 398/63; 398/66; 398/76; 398/98

(58) Field of Classification Search
CPC ...... H04B 10/27; H04B 10/271; H04B 10/40; H04Q 11/04–11/0492; H04J 14/08–14/086
See application file for complete search history.

(56) References Cited

U.S. PATENT DOCUMENTS

| | | | |
|---|---|---|---|
| 4,701,909 A | 10/1987 | Kavehrad et al. |
| 4,776,041 A | 10/1988 | Husbands |
| 5,029,333 A | 7/1991 | Graves et al. |
| 5,150,247 A | 9/1992 | Sharpe et al. |
| 5,363,408 A | 11/1994 | Paik et al. |

(Continued)

OTHER PUBLICATIONS

Persavento: "Ethernet Passive Optical Network (EPON) architecture for broadband access", Optical Networks Magazine, Jan./Feb. 2003, p. 107-113.*

(Continued)

*Primary Examiner* — Li Liu

(57) ABSTRACT

A system and method for managing the optical layer network data communications of an optical fiber data network by an optical transceiver module is disclosed. The management of the optical layer network data communications comprising data link layer functions or layer 2 functions in an OSI model. Benefits include reduction in reduced cost of network deployments from consolidation of network equipment, such as switches, and reduction in power consumed as well as enabling point-to-multipoint network connections from previously only point-to-point network connection.

26 Claims, 16 Drawing Sheets

(56) References Cited

U.S. PATENT DOCUMENTS

| | | | |
|---|---|---|---|
| 5,572,349 | A | 11/1996 | Hale et al. |
| 5,880,863 | A | 3/1999 | Rideout et al. |
| 6,023,467 | A | 2/2000 | Abdelhamid et al. |
| 6,067,319 | A | 5/2000 | Copeland |
| 6,490,727 | B1 * | 12/2002 | Nazarathy et al. ............ 725/129 |
| 6,498,667 | B1 | 12/2002 | Masucci et al. |
| 6,603,822 | B2 | 8/2003 | Brede et al. |
| 6,778,399 | B2 | 8/2004 | Medina et al. |
| 6,788,833 | B1 | 9/2004 | Brisson et al. |
| 6,792,207 | B2 | 9/2004 | Iannone et al. |
| 6,950,477 | B2 | 9/2005 | Meehan et al. |
| 6,970,461 | B2 | 11/2005 | Unitt et al. |
| 7,031,343 | B1 * | 4/2006 | Kuo et al. ...................... 370/473 |
| 7,181,142 | B1 * | 2/2007 | Xu et al. ......................... 398/66 |
| 7,242,868 | B2 | 7/2007 | Soto et al. |
| 7,317,769 | B2 | 1/2008 | Tonieto et al. |
| 7,321,612 | B2 | 1/2008 | Tonietto et al. |
| 7,486,894 | B2 | 2/2009 | Aronson et al. |
| 7,729,617 | B2 | 6/2010 | Sheth et al. |
| 2002/0006111 | A1 | 1/2002 | Akita et al. |
| 2002/0067529 | A1 | 6/2002 | Yokomoto et al. |
| 2002/0163921 | A1 | 11/2002 | Ethridge et al. |
| 2003/0091045 | A1 | 5/2003 | Choi et al. |
| 2003/0137975 | A1 * | 7/2003 | Song et al. ..................... 370/353 |
| 2003/0227926 | A1 | 12/2003 | Ramamurthy et al. |
| 2003/0236916 | A1 | 12/2003 | Adcox et al. |
| 2004/0028408 | A1 * | 2/2004 | Cox et al. ......................... 398/66 |
| 2004/0052274 | A1 | 3/2004 | Wang et al. |
| 2004/0076181 | A1 * | 4/2004 | Pantelias et al. ............. 370/468 |
| 2004/0133920 | A1 * | 7/2004 | Kim et al. ..................... 725/129 |
| 2007/0031153 | A1 | 2/2007 | Aronson et al. |
| 2008/0166124 | A1 | 7/2008 | Soto et al. |
| 2010/0158530 | A1 | 6/2010 | Soto et al. |
| 2011/0135312 | A1 | 6/2011 | El-Ahmadi et al. |

OTHER PUBLICATIONS

Oksanen et al: "Spectral Slicing Passive Optical Access Network Trial", OFC 2002, paper ThH2.*

E. Modiano et al., "A Novel Medium Access Control Protocol for WDM-Based LAN's and Access Networks Using a . . . ", Journal of Lightwave Tech., vol. 18, No. 4, Apr. 2000.

M. Saches et al., "Fibre Channel and Related Standards", IEEE Communications Magazine, Aug. 1996.

Rodovanovic, "Ethernet-Based Passive Optical Local-Area Networks for Fiber-to-the-Desk Application", Journal of Lightwave Tech., Nov. 2003, pp. 2534-2545 vol. 21 No. 11.

Chaing et al, "Implementation of STARNET: A WDM Computer Communications Network", Journal on Selected Ares of Communications, Jun. 1996, pp. 824-839, vol. 14, No. 5.

Rawson, Eric, "The Fibernet II Ethernet-Compatible Fiber-Optic Lan", IEEE Journal of Lightwave Technology, Jun. 1985, pp. 496-501, vol. LT-3, No. 3.

E. Modiano, "WDM-Based Packet Networks", IEEE Communications Magazine, Mar. 1999.

E.Modiano, "Design and Analysis of an Asynchrounous WDM Local Area Network Using a Master/Slave Scheduler", IEEE, 1999.

R. Mauger, The Integration of ATM, SDH and PON Technology in the Access Network, Fourth IEE Conference on Telecommunications 1993.

Delavaux, et al., "QAM-PON and Super PON for Access Distribution Networks", 2000.

* cited by examiner

SYSTEM AND METHOD FOR OPTICAL LAYER MANAGEMENT IN OPTICAL MODULES AND REMOTE CONTROL OF OPTICAL MODULES

CROSS-REFERENCE TO RELATED APPLICATIONS

This application is filed under 37 C.F.R. §1.53(b)(2) as a continuation-in-part claiming the benefit under 35 U.S.C. §120 of the pending patent application Ser. No. 12/982,872, "System and Method for Pluggable Optical Modules for Passive Optical Networks", which was filed by the same inventors on Dec. 30, 2010, claiming the benefit under 35 U.S.C. §120 of U.S. Pat. No. 7,925,162 filed on Jul. 6, 2004 claiming the benefit under 35 U.S.C. 119(e) of U.S. Provisional Application No. 60/485,072 filed Jul. 3, 2003, and U.S. Provisional Application No. 60/515,836 filed Oct. 30, 2003, and claiming the benefit under 35 U.S.C. §120 of the pending patent application Ser. No. 12/512,968, "System and Method For Performing High Speed Communications Over Fiber Optical Networks", which was filed by the same inventors on filed Jul. 30, 2009 claiming the benefit under 35 U.S.C. §120 of U.S. patent application Ser. No. 11/772,187, which was filed by the same inventors on Jun. 30, 2007, now abandoned, claiming the benefit under 35 U.S.C. §120 of commonly-assigned U.S. patent application Ser. No. 10/865,547 filed by the same inventors on Jun. 10, 2004, now U.S. Pat. No. 7,242,868, which claims the benefit under 35 U.S.C. 119(e) of U.S. Provisional Application No. 60/477,845 filed Jun. 10, 2003, and U.S. Provisional Application No. 60/480,488 filed Jun. 21, 2003, and entirely incorporated herein by reference.

FIELD OF THE INVENTION

The present invention relates to optical modules or optical transceivers generally, and more specifically to a network architecture employing optical modules or optical transceivers.

BACKGROUND OF THE INVENTION

Optical modules are optical transceivers or optical transponders which integrate components for the purpose of transmission and reception of optical signals into a single packaged device. The integrated components generally serve to convert electrical signals to optical signals and optical signals to electrical signals. Optical modules are used in applications requiring digital optical transmission such as SONET/SDH, Gigabit Passive Optical Networks (GPONs), Ethernet Passive Optical Networks (EPONs), Ethernet, and Fibre Channel running across metro access networks, campus area networks, wide area networks, access networks, local area networks, and storage area networks.

As shown in FIG. 1, an optical module 110 comprises of: a laser or laser diode 102 that converts an electrical input signal into an optical output signal, an optical detector or photodiode (PD) 103 that converts an optical input signal into an electrical output signal, and high speed integrated circuits (IC) such as: a laser driver (LD) 104 that takes an input signal and generates an electrical signal that modulates the laser 102, a transimpedance amplifier (TIA) 106 that converts the current output of the optical detector 103 to a voltage as large as possible with a relative minimum of electrical noise, and a limiting amplifier (LA) 106 that converts the TIA output to a suitable electrical level for signal processing. Some high speed optical modules also incorporate serializer and deserializer (mux/demux) 108 functions as illustrated in optical module 112. A serializer multiplexes multiple parallel slow rate digital data streams into a single high speed digital stream and a deserializer demultiplexes a single high speed digital stream into multiple parallel slower rate digital streams. Serializers typically incorporate a clock multiplier unit (CMU) that converts a parallel input clock signal into a serial output clock signal and deserializers typically incorporate clock data recovery (CDR) functions that recover a clock signal from a serial analog data stream.

Manufacturers of optical networking systems find optical modules attractive, because the highly integrated packaging approach can cut several months of system development and manufacturing time, consume less power and increase port densities over board-level solutions built from discrete components. But with so much functionality in one module, timely and sufficient component supply becomes even more essential for successful system delivery. Multi-source agreement (MSA) developed so systems vendors can feel more confident about getting the components they need and being able to incorporate them without costly and time-consuming system redesigns. MSAs define specification for an optical module such as: physical dimensions or cage hardware, electrical connector interfaces, electrical levels, jitter, power supply, max power draw, EMI containment, optical connector interfaces, and thermal analysis.

Further with MSAs, system vendors can concentrate on system architecture and not optical research and development. However, this also limits the usefulness or utility of MSAs to solely be optical-to-electrical and electrical-to-optical conversion devices.

Examples of the MSA optical modules are shown in FIG. 2, such as small form factor pluggable (SFP) 210, 10G small form factor pluggable (XFP) 212 and XENPAK 214. An example of MSA optical modules used in a passive optical network (PON) is shown in FIG. 3. In a PON 300, an optical line terminal (OLT) 311 communicates with optical network units (ONUs) or optical network terminals (ONTs) 314 at or near customer premises 305 (e.g., residential homes, business, schools and government buildings) over optical fibers 306 and through optical splitters 310. OLT's 311 and ONUs/ONTs 314 can communicate by using MSA optical modules 302 (e.g., SFP) to generate optical signals. OLTs 311 are generally located at a Service Provider's Central Office 304 and communicate with Edge Routers 312.

SUMMARY OF THE INVENTION

A system and method for a PON optical transceiver module is disclosed. The invention involves enabling data link layer or Media Access Control (MAC), Transmission Convergence Layer (TC-Layer) and Physical Layer (PHY-Layer) functionality via a one or more of discrete electronic components in an optical transceiver module for a passive optical network (PON), which can interface to existing Physical Media Attachment (PMA) layer devices or to devices via the Media Independent Interface (MII). This enables a consolidation of a one or more network equipment layers resulting in cost savings as well as enabling point-to-multipoint PON communications in previously only point-to-point communications such as Ethernet communications.

In one aspect of an embodiment of the invention, a PON optical transceiver module comprises a PON protocol processor and an Ethernet media access control (MAC) device. The PON protocol processor serving to manage PON data link layer communications and to de-encapsulate user data received from PON data link layer communications to the Ethernet MAC. The Ethernet MAC then serving to encapsulate the user data received from the PON protocol processor and provide the user data to a switch, router or media converter using Ethernet communications. The Ethernet MAC further serving to manage Ethernet communications with a switch, router or media converter and to de-encapsulate user data received from the switch, outer or media converter and provide the user data to the PON protocol processor. The PON protocol processor further serving to encapsulate user data received from the Ethernet MAC and encapsulate the user data for communication across the PON.

In one aspect of an embodiment of the invention, the PON protocol processor is ITU G.984 GPON or ITU G.987 XG-PON complaint.

In one aspect of an embodiment of the invention, the PON protocol processor is IEEE 802.3ah EPON or IEEE 802.3av 10G-EPON complaint.

In one aspect of an embodiment of the invention, the PON optical transceiver module is compliant to SFP, SFP+, XFP, XFP+ MSA form factors.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Figure 1:
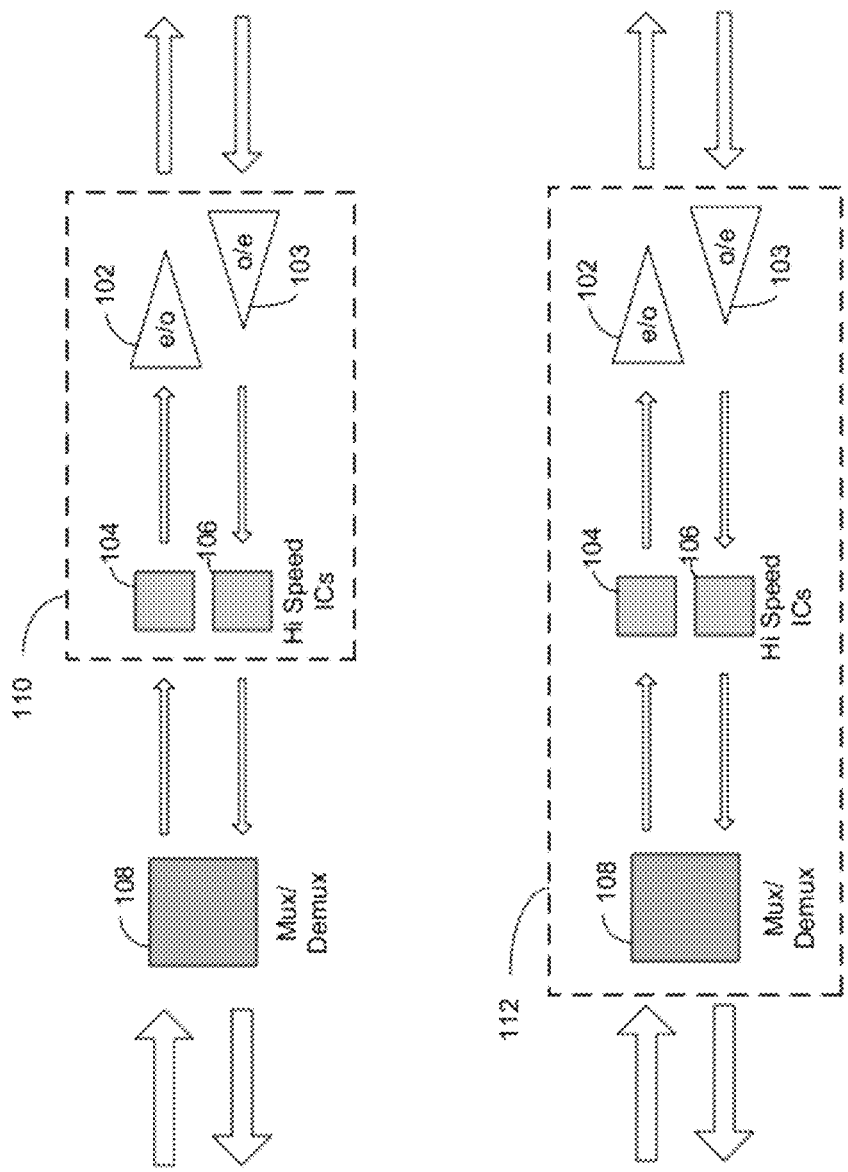
FIG. 1 is a diagram of a typical optical module and components.
Figure 2:
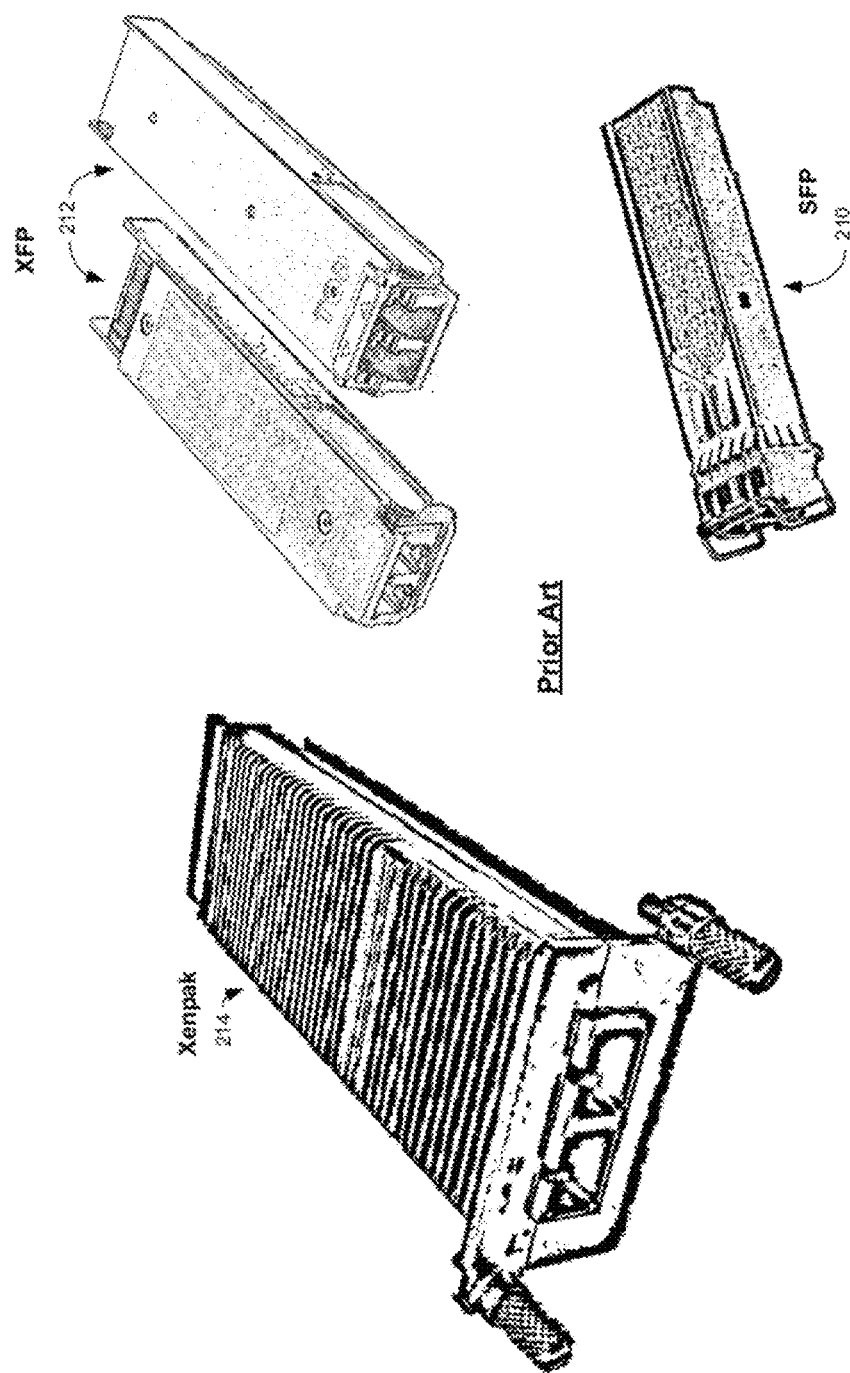
FIG. 2 is a 3D perspective of a few common MSA optical modules.
Figure 3:
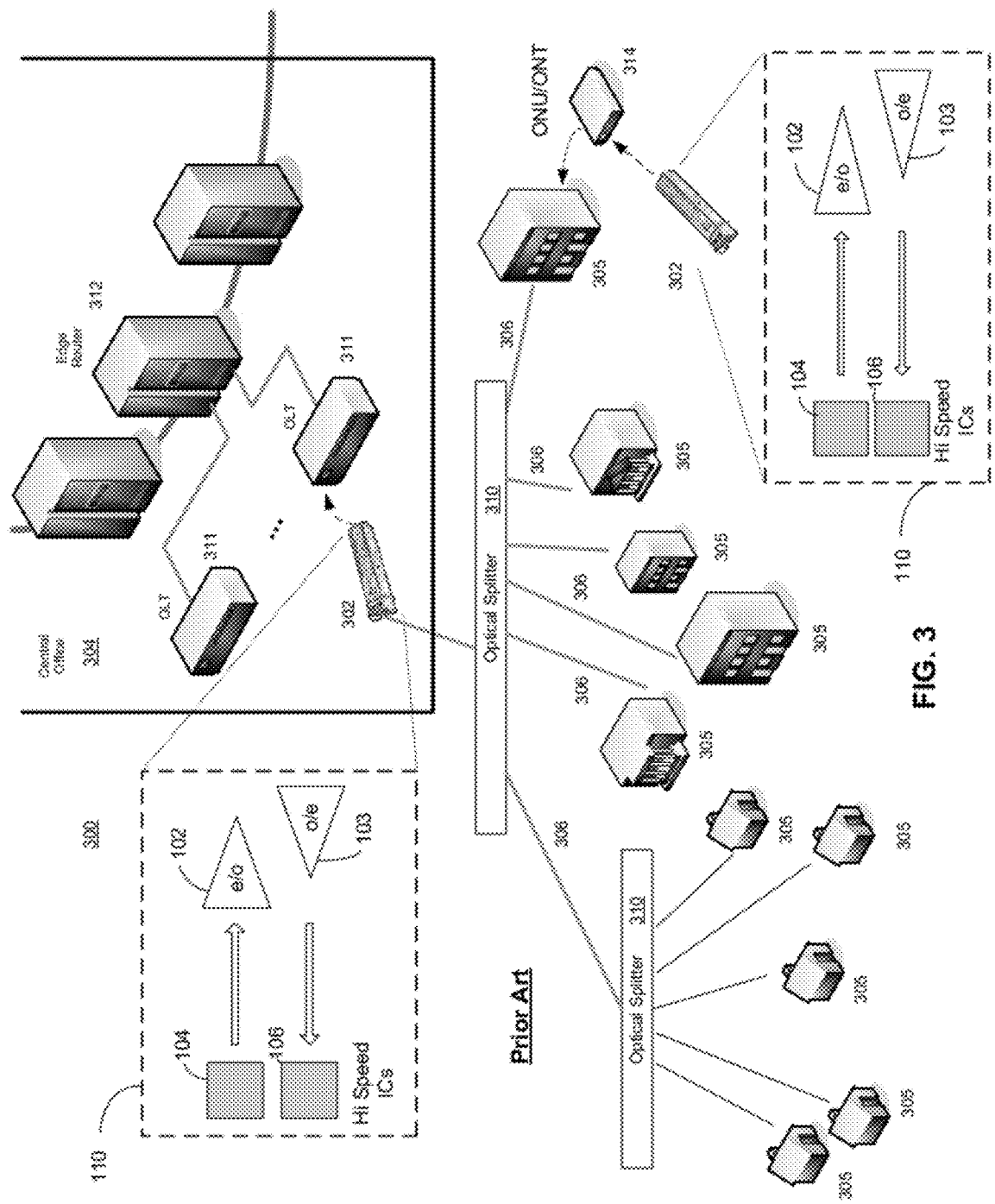
FIG. 3 is an illustration of a passive optical network including the central office and edge routers.
Figure 4:
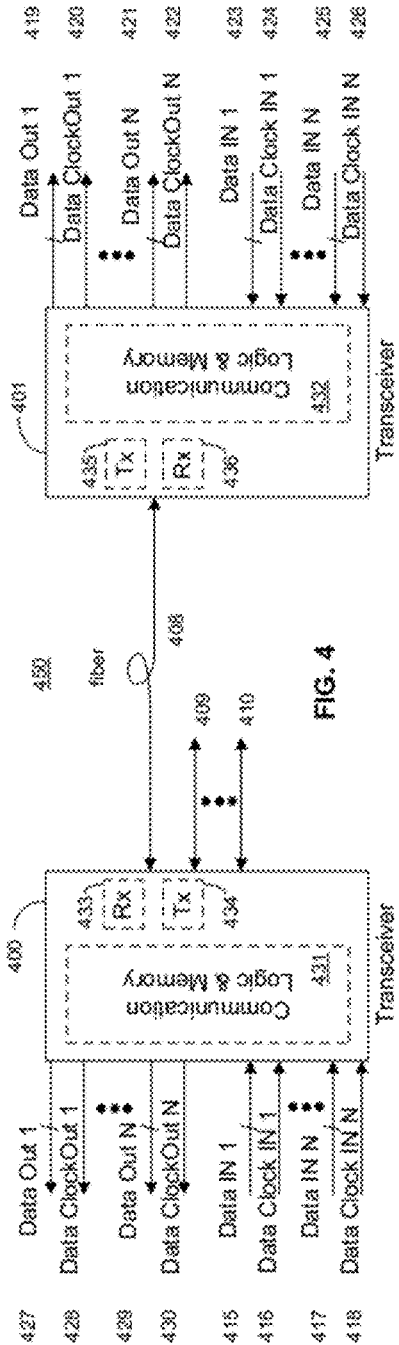
FIG. 4 is an illustration of optical transceivers in a fiber optic network.

Referring to FIG. 4, wherein like reference numerals designate identical or corresponding parts throughout the several views and embodiments, a high-level fiber optic data network 450 includes a first transceiver 400 in communication with a second transceiver 401 via a fiber 408. The first transceiver 400 and the second transceiver 401 include transmitter circuitry (Tx) 434, 435 to convert electrical data input signals into modulated light signals for transmission over the fiber 408. In addition, the first transceiver 400 and the second transceiver 401 also include receiver circuitry (Rx) 433, 436 to convert optical signals received via the fiber 408 into electrical signals and to detect and recover encoded data and/or clock signals. First transceiver 400 and second transceiver 401 can contain communication logic and memory 431, 432 (e.g., a micro controller or CPU and RAM or NVRAM and ROM) for network protocol operation or processing. Although the illustrated and described embodiments of the transceivers 400, 401 include communication logic and memory in a same package or device as the transmitter circuitry 434, 435 and receiver circuitry 433, 436, other transceiver configurations can also be used.

First transceiver 400 transmits/receives data to/from the second transceiver 401 in the form of modulated optical light signals of known wavelength via the optical fiber 408. The transmission mode of the data sent over the optical fiber 408 can be continuous, burst or both burst and continuous modes depending on the implementation of an embodiment. Alternatively, in another embodiment both transceivers 400, 401 can transmit a same wavelength (e.g., the light signals are polarized and the polarization of light transmitted from one of the transceivers is perpendicular to the polarization of the light transmitted by the other transceiver). In another embodiment, a single wavelength can be used by both transceivers 400, 401 (e.g., the transmissions can be made in accordance with a time-division multiplexing scheme or similar protocol).

In yet another embodiment in accordance with the invention, wavelength-division multiplexing (WDM) can also be used. WDM is herein defined as any technique by which two optical signals having different wavelengths can be simultaneously transmitted bi-directionally with one wavelength used in each direction over a single fiber. In one embodiment, coarse wavelength-division multiplexing (CWDM) or dense wavelength-division multiplexing (DWDM) can be used. CWDM and DWDM are herein defined as any technique by which two or more optical signals of different wavelengths are simultaneously transmitted in the same direction. The difference between CWDM and DWDM is CWDM wavelengths are typically spaced 20 nanometers (nm) apart, compared to 0.4 nm spacing for DWDM wavelengths. Both CWDM and DWDM can be used in bi-directional communications. In bi-directional communications, e.g. if wavelength-division multiplexing (WDM) is used, the first transceiver 400 can transmit data to the second transceiver 401 utilizing a first wavelength of modulated light conveyed via the fiber 408 and, similarly, the second transceiver 401 can transmit data via the same fiber 408 to the first transceiver 400 utilizing a second wavelength of modulated light conveyed via the same fiber 408. Because only a single fiber is used, this type of transmission system is commonly referred to as a bi-directional transmission system. Although the fiber optic network illustrated in FIG. 4 includes a first transceiver 400 in communication with a second transceiver 401 via a single fiber 408, other embodiments of fiber optic networks, such as those having a first transceiver in communication with one or more transceivers via one or more fibers (e.g. shown in FIG. 5), can also be used as well as those having a first and second transceiver in communication over a one or more optical fibers (e.g. fibers 409,410).

Electrical data input signals (Data IN 1) 415, as well as any optional clock signal (Data Clock IN 1) 416, are routed to the transceiver 400 from an external data source (not shown) for processing by the communication logic and memory 431. Communication logic and memory 431 process the data and clock signals in accordance with a network protocol in-use between transceivers. Communication logic and memory 431,432 provides management functions for received and transmitted data including queue management (e.g., independent link control) for each respective link, demultiplexing/multiplexing and other functions as described further below. The processed signals are transmitted by the transmitter circuitry 434. The resulting modulated light signals produced from the first transceiver's 400 transmitter 434 are then conveyed to the second transceiver 401 via the fiber 408. The second transceiver 401, in turn, receives the modulated light signals via the receiver circuitry 436, converts the light signals to electrical signals, processes the electrical signals using the communication logic and memory 432 (in accordance with an in-use network protocol) and can output the result through electrical data output signals (Data Out 1) 419, as well as optional clock signals (Data Clock Out 1) 420.

Similarly, the second transceiver 401 receives electrical data input signals (Data IN 1) 423, as well as any optional clock signals (Data Clock IN) 424, from an external data source (not shown) for processing by the communication logic and memory 432 and transmission by the transmitter circuitry 435. The resulting modulated light signals produced from the second transceiver's 401 transmitter 435 are then conveyed to the first transceiver 400 using the optical fiber 408. The first transceiver 400, in turn, receives the modulated light signals via the receiver circuitry 433, converts the light signals to electrical signals, processes the electrical signals using the communication logic and memory 431 (in accordance with an in-use network protocol), and can output the result through electrical data output signals (Data Out 1) 427, as well as optional clock signals (Data Clock Out 1) 428.

Fiber optic data network 450 can include a one or more electrical input and clock input signals, denoted herein as Data IN N 417/425 and Data Clock IN N 418/426, respectively, and one or more electrical output and clock output signals, denoted herein as Data Out N 429/421 and Data Clock Out N 430/422, respectively. The information provided by one or more of the electrical input signals can be used by a given transceiver to transmit information via the fiber 408 and, likewise, the information received via the fiber 408 by a given transceiver can be outputted by one or more of the electrical output signals. On or more of electrical signals denoted above can be combined to form data plane or control plane bus(es) for input and output signals respectively. In some embodiments, the one or more of electrical data input signals and electrical data output signals are used by logic devices or other devices located outside (not shown) a given transceiver to communicate with the transceiver's communication logic and memory 431, 432, transmit circuitry 434, 435, and/or receive circuitry 433,436.

Figure 5:
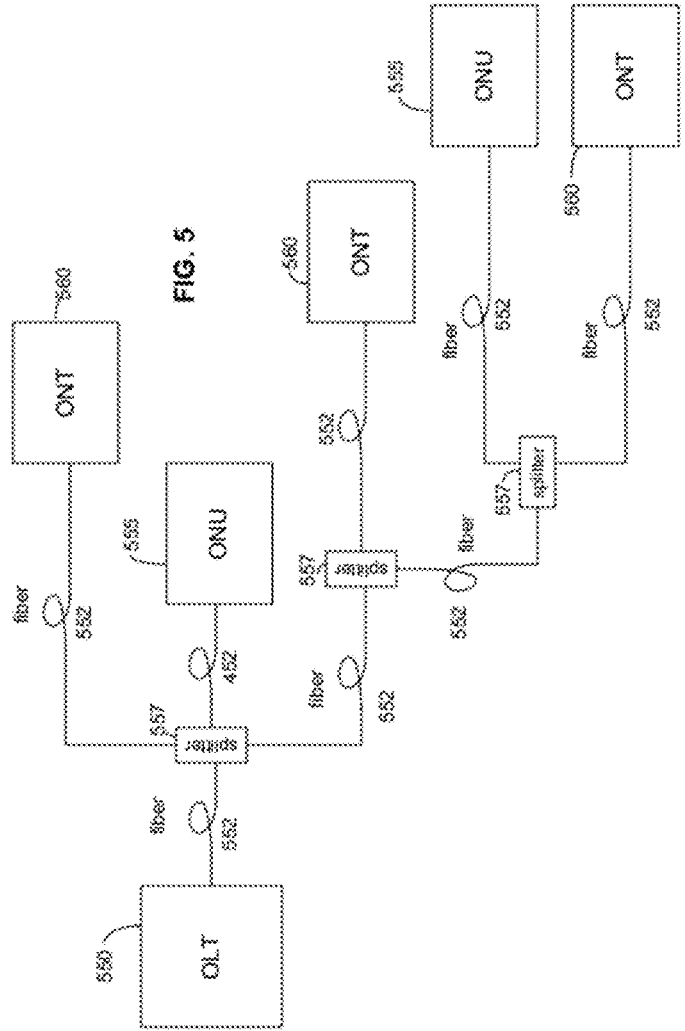
FIG. 5 is an illustration of a block diagram of a passive optical network (PON).

FIG. 5 illustrates an embodiment of a broadband access passive optical network (PON), where the functions described above are associated in an exemplary embodiment with the first transceiver 400 and the second transceiver 401 of FIG. 4, are implemented in an optical line terminator (OLT) 550 and one or more optical networking units (ONU) 555, and/or optical networking terminals (ONT) 560, respectively. PON(s) can be configured in either a point-to-point network architecture, wherein one OLT 550 is connected to one ONT 560 or ONU 555, or more typically in a point-to-multipoint network architecture, wherein one OLT 550 at the head-end of the PON is connected to a one or more ONT(s) 560 and/or ONU(s) 555 as clients of the OLT. In the embodiment shown in FIG. 5, an OLT 550 is in communication with multiple ONTs/ONUs 560, 555 via one or more optical fibers 552. The fiber 552 coupling the OLT 550 is also coupled to other fibers 552 connecting the ONTs/ONUs 560, 555 by one or more passive optical splitters 557. Typically the OLT 550 is located at or near a Central Office (CO) or at a remote facility of a service provider and the ONTs/ONUs 560, 555 are located at or near residences or businesses and sometimes cell towers.

An ONT is a single integrated electronics unit that terminates the PON and presents native service interfaces to the user or subscriber. An ONU is an electronics unit that terminates the PON and can present one or more converged interfaces, such as ITU xDSL, Multimedia over Coax Alliance (MoCA), G.hn, G.fast or IEEE Ethernet (e.g., 100BaseT, 1000BaseT, 10GBaseT), toward the user. An ONU typically requires a separate subscriber unit to provide native user services such as telephony, Ethernet data, or video. In practice, the difference between an ONT and ONU is frequently ignored, and either term is used generically to refer to both classes of equipment.

All of the optical elements between an OLT and ONTs/ONUs are often referred to as the Optical Distribution Network (ODN). Other alternate network configurations, including alternate embodiments of point-to-multipoint networks are also possible. For example, a passive optical network in a local area network architecture wherein a Network Manager (NM) replaces an OLT and Network Client Adapter replaces ONTs/ONUs. Generally OLTs and ONTs/ONUs are associated with broadband access networks provided by service providers. Broadband access networks and local area networks (LANs) are inherently not the same type of networks and serve different needs, and thus generally have different design requirements which are reflected in, generally, different optics being used (i.e. different types or classes of lasers, different types of optical fiber such as single mode vs multi-mode fiber), different network protocols with different timing and addressing requirements, and the need for carrier class network equipment in broadband access networks by service providers to meet service level agreements (SLAs) which, in general, local area networks have no such requirement. Hence the designation by the Applicants of a Network Manager as the head-end (similar to an OLT) of a passive optical local area network and Network Client Adapter as clients (similar to ONTs/ONUs) to the Network Manager. All of the optical elements between an NM and an NCA will also be referred to as the ODN.

It will be appreciated that one or more elements or blocks in the following embodiments can be sealed in one or more faraday cages. It will also be appreciated that one or more elements or blocks in the following embodiments can be combined onto one or more integrated circuits (IC) or surface mount photonic (SMP) devices.

Figure 6:
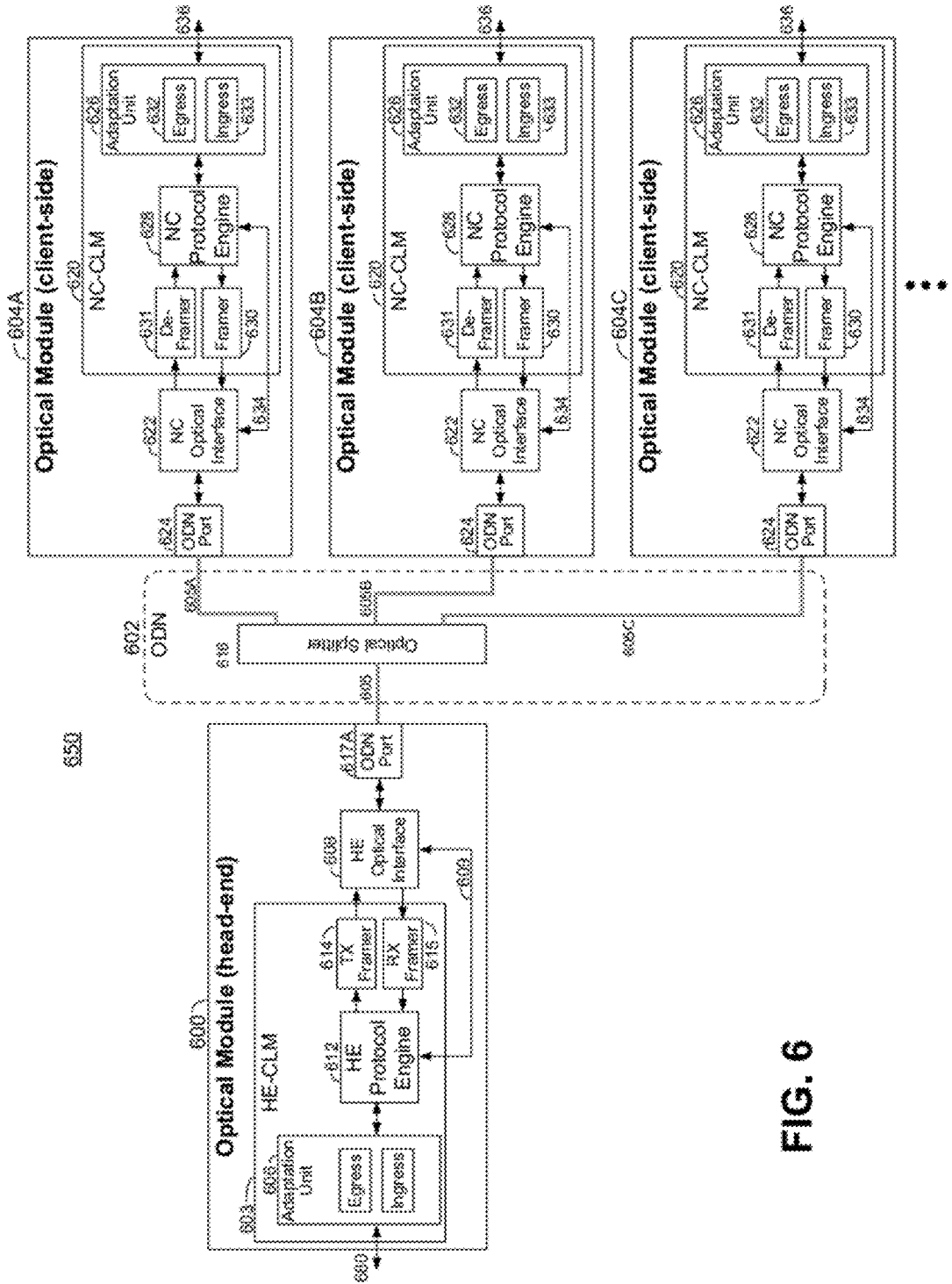
FIG. 6 is an illustration of a block diagram of optical modules in a point-to-multipoint network in accordance with an embodiment of the present invention.

Referring now to FIG. 6, a high-level schematic of a passive optical network 550 includes a head-end optical module 600 at the head end of a passive optical distribution network (ODN) 602. The head-end optical module 600, as an embodiment of transceiver 400, acts as a central transmission point and an overall controlling device for the passive optical network 650. On another end, the ODN 602 is terminated by a one or more (in one embodiment, generally similar) network client-side optical modules 604A, 604B, 604C as an embodiment of transceiver 401. Herein the network client-side optical modules 604A, 604B, 604C, are also referred to collectively as network client-side optical modules 604. Though three network client-side modules 604 are shown more or fewer network client-side optical modules can be included in the passive optical network 650.

The head-end optical module 600 includes a head-end communication logic and memory (HE-CLM) 603 block, a head-end optical interface (HE Optical Interface) 608 block and an optical distribution fabric network port (ODN Port) 617 block. The HE-CLM 603 includes a head-end protocol engine 612 block, a transmit framer (Tx Framer) 614 block and a receive framer (Rx Framer) 615 block.

The head-end Protocol Engine 612 block is a control module that performs various control and data operation processing functions (e.g., as per a data link layer protocol or layer 2 protocol according to the OSI model) such as Operations and Administration Management (OAM) messaging, ONU transmission scheduling and data encryption and decryption security functions required of the head-end of a PON. The Tx Framer 614 frames outgoing data from the HE Protocol Engine 612 in accordance with a framing protocol (e.g., data link layer protocol or layer 2 protocol according to the OSI model) that is in-use by an embodiment. The Rx Framer 615 receives incoming frames and recovers appropriate data and messages to pass on to the HE Protocol Engine 612. The HE Optical Interface 608 can be controlled by the HE-CLM 603 using, for example, bus 609. The HE Optical Interface 608 converts electrical signals carrying data from the Tx Framer 614 to optical signals, for example, by modulating a laser (not shown) included in the HE Optical Interface 608 and transmitting the laser output to the ODN port 617. The HE Optical Interface 608 also receives optical signals from the ODN port 617 and converts the optical signals to electrical signals carrying data (e.g., using a PD) that is then transferred to the Rx Framer 615. The HE Optical Interface 608 functions as an "optical-electrical converter" or "electrical-optical converter" that can convert a signal from an optical signal to electrical signal or from an electrical signal to an optical signal. The HE Optical Interface 608 in accordance with an embodiment of the present invention can be comprised of transmitter optical sub-assembly (TOSA) and receiver optical sub-assembly (ROSA) or bidirectional optical sub-assembly (BOSA).

It will be appreciated that in some embodiments in accordance with the invention the HE Protocol Engine 612 block, Tx Framer 614 and Rx Framer 615 can be combined into a single IC which will be referred to as an HE PON Protocol Processor. The HE PON protocol processor performing the functions of a data link layer protocol or layer-2 protocol according to the OSI model. Examples of data link layer protocols for the head-end of a PON can be found in the following protocol specifications (herein incorporated by reference): ITU-T G.984 (GPON); IEEE 802.3ah (EPON); ITU-T G.987 (XG-PON); IEEE 802.3av 10 Gigabit Ethernet PON (10G-EPON); ITU Next Generation PON (NG-PON); ITU NG-PON2; WDM-PON; ITU-T G.983 (BPON); Data over Cable Service Interface Specification (DOCSIS) PON (D-PON/DPON), and RFoG SCTE IPS910 as well as any future addendum, annex, normative revision or new version of these protocols for feature, capability or speed enhancements. Examples of functions performed at the data link layer include but are not limited to: encapsulating user data into data link layer frames; frame synchronization; forward error correction; physical layer addressing; data packet queuing, and operation administration and maintenance (OAM) message processing.

The ODN port 617 is an area of the optical module having an optical fiber connector socket (e.g., SC, LC, FC, ST, or MU connector sockets) for coupling the optical module to the optical waveguides 605 (e.g., single mode optical fiber, multi-mode optical fiber).

The ODN 602 can include any of a variety of passive optical components including optical fibers (e.g., single mode optical fibers, multi-mode optical fibers), optical connectors, fiber splices, passive branching components (e.g., passive splitters), passive optical attenuators, fiber BRAGG gratings and active repeaters designed to extend the distance of the ODN.

The network client-side optical modules 604 each include a network client communication logic and memory (NC-CLM) 620 block, a network client optical interface (NC Optical Interface) 622 block and an ODN port 624. The NC-CLM 620 block includes an Adaptation Unit 626 block, a network client protocol engine (NC Protocol Engine) 628 block, a transmit framer (Framer) 630 block and a receiver framer (Deframer) 631 block. The NC Protocol Engine 628 is a control module that performs various functions associated with a network client on a PON (e.g., as per a data link layer protocol or layer 2 according to the OSI model), such as responding to messages from the head-end optical module 600. The Framer 630 frames outgoing data and response messages from the NC Protocol Engine 628 in accordance with a framing protocol (e.g., data link layer protocol or layer 2 according to the OSI model) that is in-use by an embodiment. The Deframer 631 receives incoming frames and recovers appropriate data and messages to pass on to the NC Protocol Engine 628. The adaptation unit 626 receives and transmits data and messages in the form of frames, packets or cells according to one or more external protocol(s). External controls, data and messages can be received using the network interface 636. The responsibilities of the adaptation unit 626 can include providing buffering, data and/or message filtering and translation between the external protocol(s) and the protocol of the passive optical network 650. The adaptation unit 626 includes egress queue 632 block and ingress queue 633 block. Egress and ingress queues 632, 633 can be of the form of memory and are used for buffering receive and transmit data and messages, respectively. The adaptation unit 626 can filter out or drop data and/or messages that are not intended to egress through its network interface 636. Filtering can be based on the destination address of the data and/or messages according to the external protocol in-use. Additionally, the adaptation unit 626 can filter out or drop data and/or messages that are not intended to ingress through its network interface 636. Filtering can be based on equal values for the source and destination addresses of the data and/or messages according to the external protocol in-use. The NC Optical Interface 622 can be controlled by the NC-CLM 628 using bus 634. The NC Optical Interface 622 converts electrical signals carrying data from the Framer 630 block to optical signals, for example, by modulating a laser (not shown) included in the NC Optical Interface 622 and transmitting the laser output to the ODN port 624. The NC Optical Interface 622 also receives optical signals from the ODN port 624 and converts the optical signals to electrical signals carrying data that is then transferred to the Deframer 631 block. The ODN port 624 is an area of the optical module having an optical fiber connector socket (e.g., an SC, LC, FC ST, or MU connector socket) for coupling the optical module to the optical waveguides 605A-C (e.g., single mode optical fiber, multi-mode optical fiber).

It will be appreciated that in some embodiments in accordance with the invention the NC Engine 628 block, Framer 630 and Deframer 631 can be combined into a single IC which will be referred to as a network client (NC) PON Protocol Processor. The NC PON protocol processor performing the functions of a data link layer protocol or layer-2 protocol according to the OSI model. Examples of data link layer protocols for the client side of PONs can be found in the following protocol specifications (herein incorporated by reference): ITU-T G.984 (GPON); IEEE 802.3ah (EPON); ITU-T G.987 (XG-PON); IEEE 802.3av 10 Gigabit Ethernet PON (10G-EPON); ITU Next Generation PON (NG-PON); ITU NG-PON2; WDM-PON; ITU-T G.983 (BPON); Data over Cable Service Interface Specification (DOCSIS) PON (D-PON/DPON), and RFoG SCTE IPS910 as well as any future addendum, annex, normative revision or new version of these protocols for feature, capability or speed enhancements. Examples of functions performed at the data link layer include but are not limited to: encapsulating user data into data link layer frames; frame synchronization; forward error correction; data packet queuing, and operation administration and maintenance (OAM) message processing.

The network client-side optical modules 604 can be coupled to external host devices such as data link layer devices (not shown) or network layer devices (not shown) using network interface 636. The data link layer devices and network layer devices are host devices that operate at a Layer-2 or Layer-3 respectively, according to the Open Systems Interconnect (OSI) 7-layer reference model. Furthermore, these network devices can comply with industry standard specifications such as IEEE 802.3 (Ethernet) and Fibre Channel (incorporated herein by reference). Other Layer-2 and Layer-3 type interface specifications can also be used.

It will be appreciated that, in an embodiment of the invention, the head-end optical module 600 can be managed via communications through network interface 680. It is envisioned that, in some embodiments, the head-end optical module 600 is remotely controlled and is an addressable device (e.g., having an Ethernet MAC to communicate to the host device such as a switch, router or media converter in some embodiments as well as a TCP/IP protocol stack to obtain a TCP/IP network address for the optical module in additional embodiments) on a service provider's network or operator's network. These communications can, among other things, manage services that affect subscriber SLA's such as: quality of service (QoS) for different classes of client-side or subscriber data traffic; subscriber service provisioning and de-provisioning; subscriber bandwidth allocations or grants, as well as monitor network alarms and form factor optical transceiver module digital diagnostics (e.g. Small Form Factor Committee SFF-8472 Specification for Diagnostic Monitoring Interface for Optical Transceivers) for both head-end and client-side. The communications can be in-band with other network traffic destined for clients of the head-end optical module 600 or in out-of-band communications (e.g., communications on another wavelength). Inter-process communication (IPC) protocols can be used for this in-band communication enabling the exchange of data between the head-end optical module 600 and one or more computers or servers connected via network interface 680 data traffic interface. The SFF-8472 specification (hereby included by reference) can be modified to also adds new options to the previously defined two-wire interface ID memory map that accommodate embodiments of the invention allowing for in-band communications to be used instead of two-wire interface ID memory map.

Figure 7:
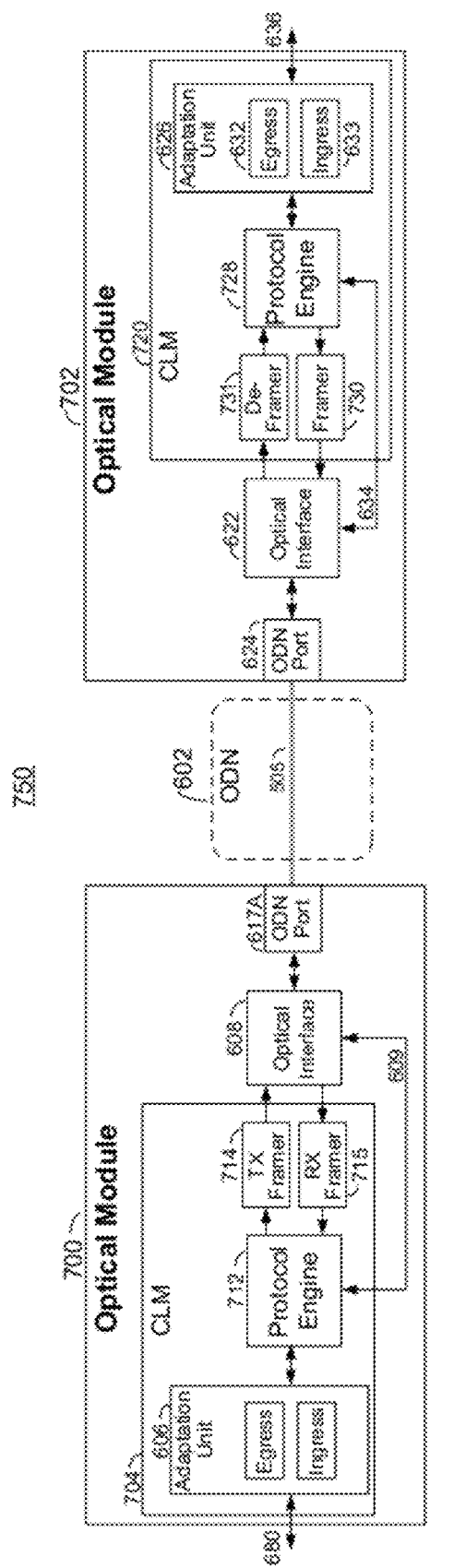
FIG. 7 is an illustration of a block diagram of optical modules in a point-to-point network in accordance with an embodiment of the present invention.

Referring now to FIG. 7 which illustrates optical modules in a point-to-point network as opposed to the point-to-multi-point passive optical network of FIG. 6. Optical modules 700 and 702 need not be differentiated by head-end or network client side, furthermore the optical modules can use different MSA form factors (e.g., SFP, SFP+, XFP) and additionally only one side or a single side need be an optical module in accordance with an embodiment of the present invention. The CLM 704, 720 have Protocol Engine 712, 728, Tx framer 714, Rx framer 715, framer 730, deframer 731 blocks that implement point-to-point network protocols such as IEEE 802.3 Ethernet or Fibre Channel.

Referring now to FIGS. 8, 9A, 9B, 10, and 11 in view of FIG. 6, some of the control and data operation processing and scheduling functions performed by either the head-end CLM's 603 HE Protocol Engine 612, Tx framer 614, Rx framer 615 and network client side CLM's 620 NC Protocol Engine 628, framer 630 and deframer 631 blocks are illustrated according to an exemplary embodiment of the invention. The passive optical network 650 transfers data between an head-end optical module 600 and the network client side optical module 604 in the form of downstream frames (HE optical module 600 to network client side optical module 104) and upstream "virtual frames" (network client side optical module 604 to head-end optical module 600). Downstream frames from the head-end optical module 600 are transmitted into the ODN 602 in an essentially continuous sequence of constant period frames. In one embodiment, downstream frames have a period of 125 μs, and transfer data downstream at a rate of approximately 10 Gb/s, although other periods and rates can be used. The optical splitter 616 splits the downstream transmissions passively so that all network client-side optical modules 604 receive the frames in a generally broadcast manner. In the upstream direction, separate transmissions from the one or more network client-side optical modules 604 are transmitted as burst transmissions or in slots that are combined in a virtual frame so that the separate burst transmissions do not collide when they arrive at the head-end optical module 600. In one embodiment, the virtual upstream frames have essentially the same period as the downstream frames, and upstream data transmissions are transmitted at a rate approximately equal to the downstream rate. Alternatively, different upstream and downstream rates can be used.

Figure 8:
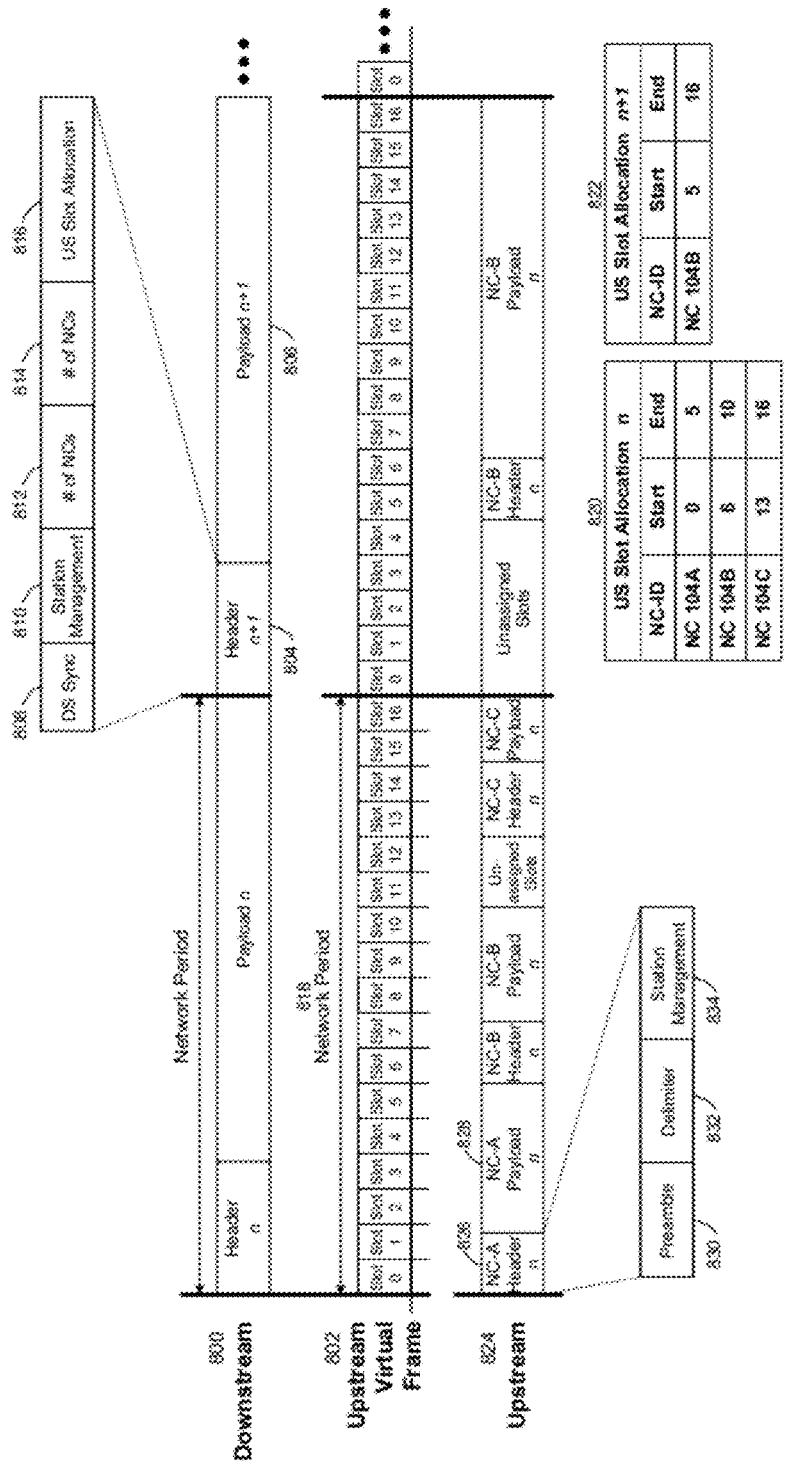
FIGS. 8, 9A and 9B are illustrations of an exemplary network protocol flow and frame structure in accordance with an embodiment of the present invention.

FIG. 8 is a schematic timing and framing diagram, showing overall structure of an exemplary downstream frame 800, and an exemplary virtual upstream frame 802 in an exemplary implementation of a framing protocol. Referring now to FIG. 8 in view of FIG. 6, each downstream frame 800 includes a header 804 and a payload section 806. The downstream header 804 includes a downstream synchronization (DS Sync) 808 section, a station management 810 section, two sections containing the number of network client-side (NC) 604 clients in communication with the head-end optical module 600 (# of NCs) 812, 814 and an upstream slot allocation (US slot allocation) 816 section. The DS Sync 808 section includes a consecutive sequence of bits that enables receiving network client side optical modules 604 to identify a beginning of the downstream frame 800 (e.g., for frame synchronization) and thus acts as starting marker for frame timing throughout the passive optical network 650 (e.g., start of a 125 µs period or network period). The number of network client-side optical modules 604 in communication with the head-end optical module 600 is sent twice 812, 814 to ensure correct interpretation of the US slot allocation section 816. The order of downstream header sections 810, 812, 814, 816 after a DS Sync 808 can differ in other embodiments.

During each network period 818 defined by respective adjacent downstream headers, each network client-side optical module 604 is able to send upstream data. The virtual upstream frame 802 is partitioned into slots, where a "slot" corresponds to a fixed number of bits or a fixed length of time within a virtual frame. For each network period 818, the head-end 600 allocates each network client-side 604 respective slots within which a network client-side 604 is able to transmit data upstream. Each slot allocation includes a start slot number and end slot number (also referred to as start time and end time), relative to the starting marker defined by a DS Sync 808 from the next network period after a network client-side 604 receives a slot allocation. In some embodiments, a start slot number and a length of time during which a specific network side client 604 is permitted to transmit can be sent instead of a start slot number and an end slot number. Slot allocation start and end numbers are allocated within the virtual upstream frame so that slot allocations do not overlap, ensuring that there are no collisions of data from different network client-side clients 604 at the receiving head-end 600. The allocations can be determined by the HE Protocol Engine 612 based on total upstream bandwidth requests and can be communicated to network clients 604 in the downstream frame US slot allocation 816 section. The US slot allocation 816 section includes start and end slot numbers pertaining to and identified to specific network clients 604 (as shown in 820 and 822). Slot allocations assigned to network clients 604 can be dynamic and can be changed from network period to network period.

The upstream frame 824 includes header 826 and payload 828 sections. The header 826 includes a preamble 830 section, a frame delimiter (Delimiter) 832 section and a station management 834 section. The preamble 830 section includes a consecutive sequence of bits designed to aid a head-end 600 in synchronizing to the bit clock of a respective transmitting network client 604. The Delimiter 832 includes a consecutive sequence of bits designed to aid a head-end 600 in synchronizing to and recognizing the beginning of an upstream frame 824 (i.e., frame synchronization).

Figure 9A:
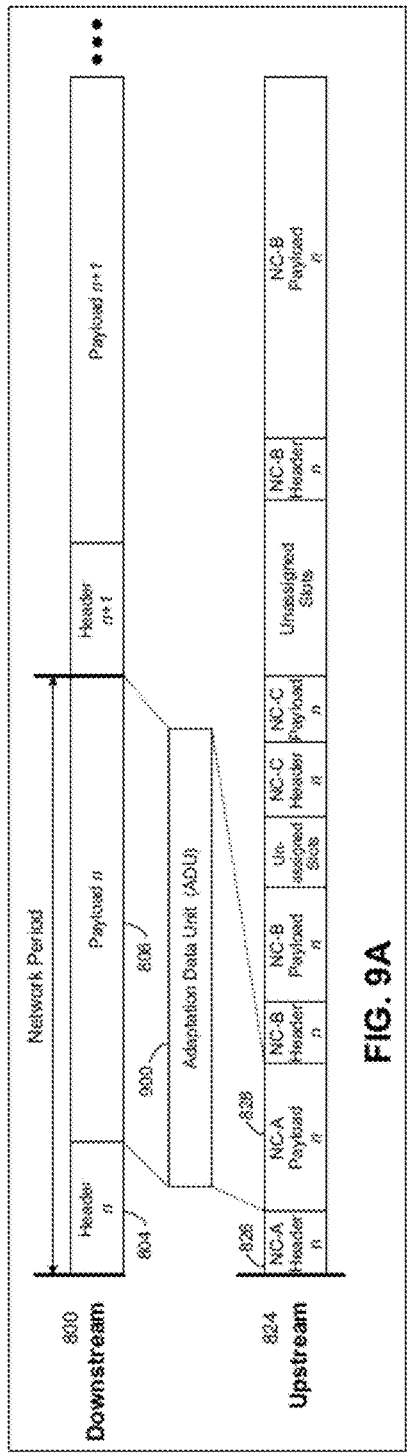

Each downstream frame 800 and upstream frame 824 includes a payload section 806, 828, respectively. FIG. 9A is a schematic showing the payload in downstream and upstream framing, showing that the payload of both upstream and downstream can contain a single adaptation data unit (ADU) 900. ADUs 900 are output units of data from an adaptation unit 606,626, where the adaptation unit 606,626 has processed data received from the network interface 680, 636 for transfer across the passive optical network 650.

Figure 9B:
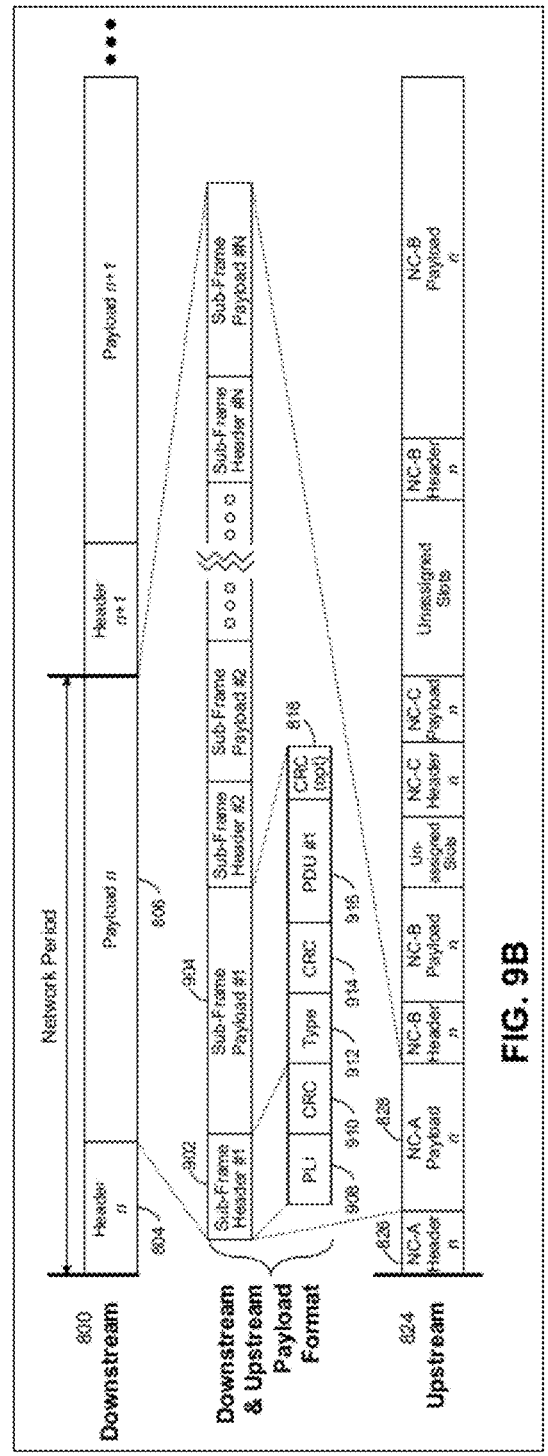

In one embodiment, the payload 804, 832 of downstream frames 800 and upstream frames 824 can include multiple consecutive sub-frames. Referring now to FIG. 9b in view of FIG. 6, a sub-frame includes a sub-frame header 902 section and a sub-frame payload 904 section. A sub-frame header 902 section includes a payload length indicator (PLI) 908 and cyclic redundancy check (CRC) 910 section that covers the PLI 908. CRC sections, although not shown, can be used in the downstream 800 and upstream 824 frames as well. The sub-frame payload 904 section includes a type 912 section, a CRC 914 that relates to the type 912 section, a payload data unit (PDU) 916 and optionally a CRC 918 that relates to the PDU 916. The PLI 908 gives an indication of the length, e.g., in bits, of the sub-frame payload 904 section immediately following the sub-frame header 902. The type 912 section gives an indication of the type of data in the PDU 916. An adaptation unit 606,626 can receive data from a mixture of protocols essentially simultaneously (as described below) and the use of sub-frames allows the data to be transferred across the network ensuring quality of service or class of service. An adaptation unit 606,626 can use sub-frames by encapsulating or placing received data in the PDU 916, indicating the type of data received in the type 912 section and entering the length of the sub-frame payload 904 in the PLI 908 section.

Figure 10:
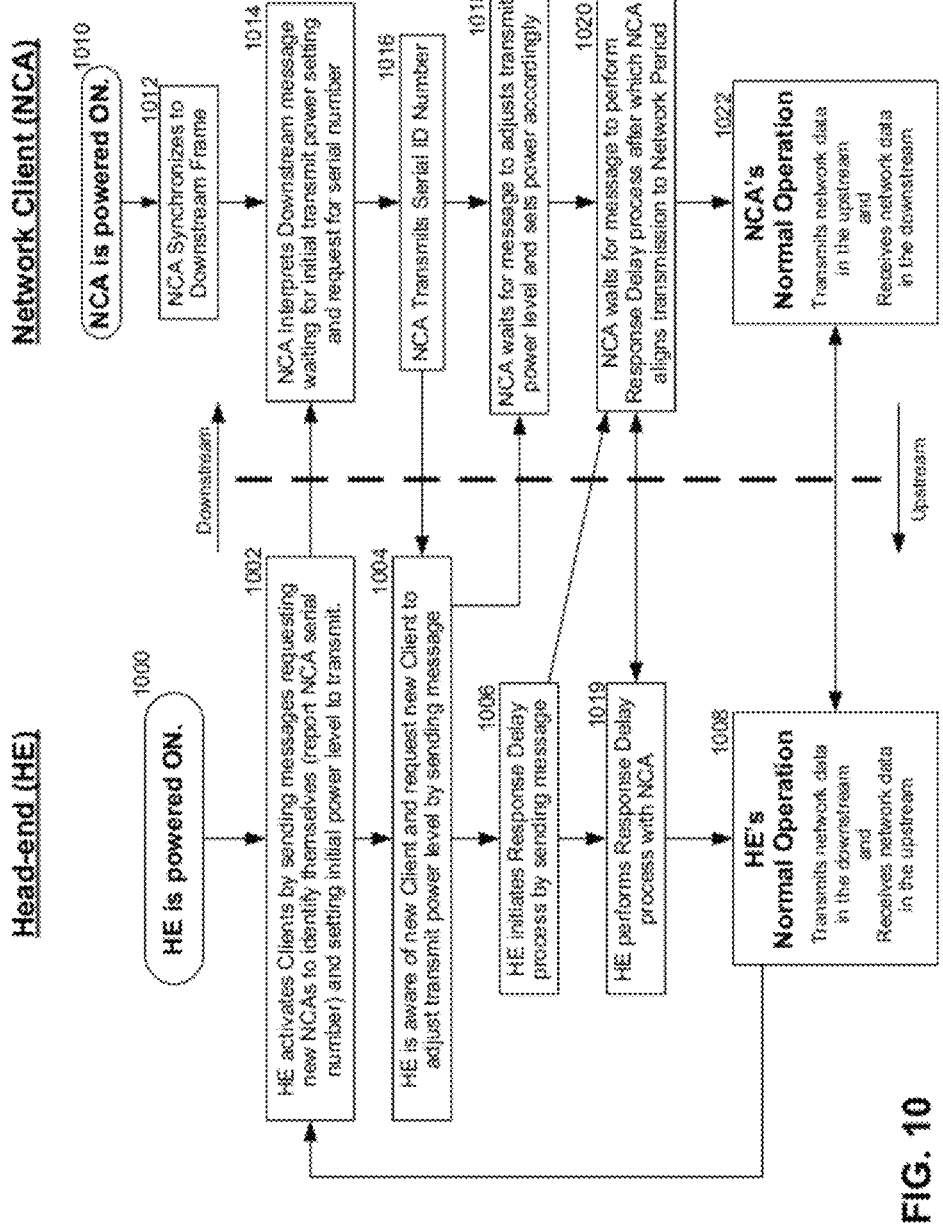
FIG. 10 is a flowchart illustrating an exemplary network operating process in accordance with an embodiment of the present invention.

Referring now to FIG. 10 in view of FIG. 6, an additional exemplary operational processes performed by either the head-end CLM's 603 HE Protocol Engine 612, Tx framer 614, Rx framer 615 and network client side CLM's 620 NC Protocol Engine 628, framer 630 and deframer 631 blocks are illustrated. After a head-end 600 is powered on 1000, the head-end 600 sends out 1002 one or more message(s) requesting new network clients 604 (network clients 604 that the head-end 600 is unaware of) to identify themselves by reporting to the head-end 600 with their respective serial number. The head-end 600 also sends out 1002 network parameters including initial network client transmit power levels using, for example, a station management message(s). The network clients 604 respond using slot allocation(s) given by the head-end 600 for new network clients 604 to respond. After successfully receiving new network client serial numbers, the head-end 600 assigns each new network client 604 a network identification number (NC-ID) and requests 1004 the new network clients 604 to adjust their transmitting power level. In one embodiment, the head-end 600 sends these requests in a station management message. The respective new network clients 604 use the assigned NC-ID to interpret specific messages of concern (i.e., addressed) to a given network client 604. The head-end 600 initiates 1006 a response delay process to determine the delay in responses between the new network client and the head-end 600. After performing 1019 the response delay process, the head-end 600 enters normal operation in which network data is transmitted and received 1008 across the passive optical network 650.

When a network client 604 is powered on 1010, the network client 604 attempts to synchronize 1012 to downstream frames by searching for the DS Sync 808. After successful downstream synchronization, the network client 604 interprets 1014 network parameters received via downstream station management messages 1004, adjusts its initial transmit power level and awaits instructions (e.g., a message) for new network clients 604. The instructions include a slot allocation for new network clients 604 to respond 1016 to the head-end 600 with the network client's 604 serial number. Once the network client 604 has sent its serial number the network client 604 is then assigned an NC-ID by the head-end 600. The network client 604 then enters a waiting loop (e.g., for a station management message from the head-end 600 to adjust its transmit power level). In response to a request to set transmit power level, the network client 604 adjusts the transmit power level 1018. The network client 604 then enters a waiting loop again (e.g., until receipt of a message from the head-end 600 to initiate a response delay process). Upon receipt of an instruction to begin a response delay process, the network client 604 can, in cooperation with the head-end 600, determine the delay between the respective network elements (not shown as part of the process flow). The details of the response delay process are described in greater detail below. After the network client 604 and head-end 600 complete the response delay process, the network client 604 can adjust 1020 its alignment with the network period to account for downstream and upstream transmission delay. The network client 604 then enters its normal operation state in which network data is received and transmitted 1022.

Figure 11:
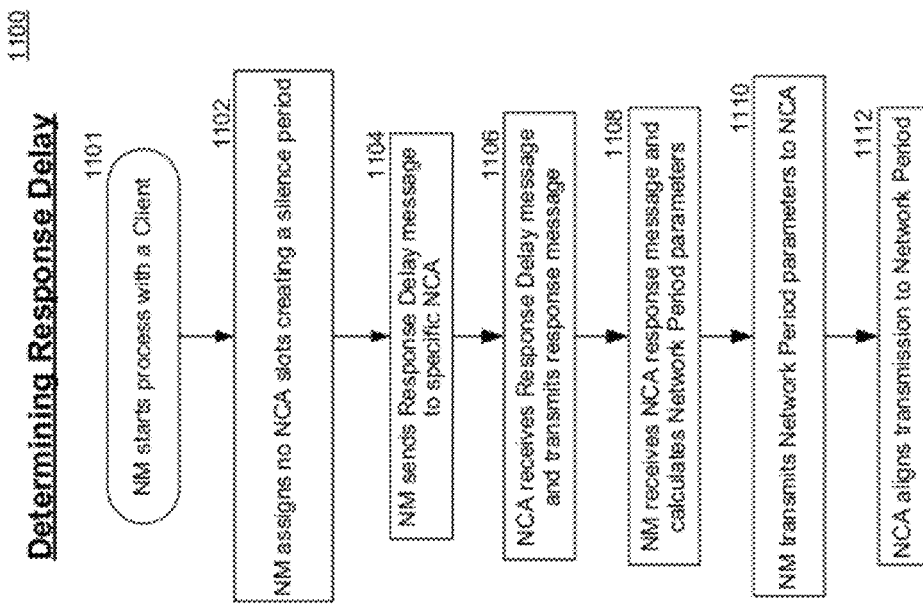
FIG. 11 is a flowchart illustrating an exemplary response delay determination process in accordance with an embodiment of the present invention.

FIG. 11 illustrates an exemplary process for performing a response delay process 1100. The response delay process 1100 is a process to determine the delay in head-end downstream transmission to head-end upstream reception of a message or network data transmission. Referring now to FIG. 11 in view of FIGS. 6 and 8, the head-end 600 starts 1101 the delay process with a new network client 604 or with a network client 604 that is or can cause upstream transmission collisions. The head-end 600 assigns one or more slot(s) to the target network client 604 (i.e., the new network client or one network client that can cause a collision in upstream communication) to respond with a response delay message. The head-end 600 generates a silence period 1102 in the upstream virtual frame 802 (e.g., by not assigning or granting any slots for that period) around the slot(s) assigned to the target network client 604. The silence period ensures no upstream collisions will occur. The head-end 600 sends 1104 a message to the network client 604 to respond with a response delay message and informs the network client 604 of its slot(s) assignment to respond. Thereafter, the network client 604 responds 1106 to the head-end 600 at the appropriate slot time. The head-end 600 receives the network client 604 response delay message and calculates 1108 the transmission delay. In one embodiment, the head-end 600 transmits 1110 the result of the response delay calculation to the network client 604 and the network client 604 aligns 1112 itself to the proper network period.

The head-end 600 can assign, schedule or grant slot allocations in a number of ways (e.g. according to fixed time-division multiplex or statistical time-division multiplex schemes). In one embodiment the slot allocations are scheduled to give the network clients 604 a guaranteed minimum upstream transfer rate. The rate can be determined by dividing the maximum upstream data rate by the number of network clients 604. In another embodiment, the head-end 600 receives status information about the network clients' 604 egress 632 and ingress 633 queue statuses. The head-end 600 can schedule slot allocations that best minimize the depth of the egress 632 and ingress 633 queues to minimize transmission delays ensuring quality of service (QOS) or class of service (COS). For example, using a dynamic bandwidth allocation (DBA) algorithm which gives priority allocations or grants based on queue depths.

Figure 12:
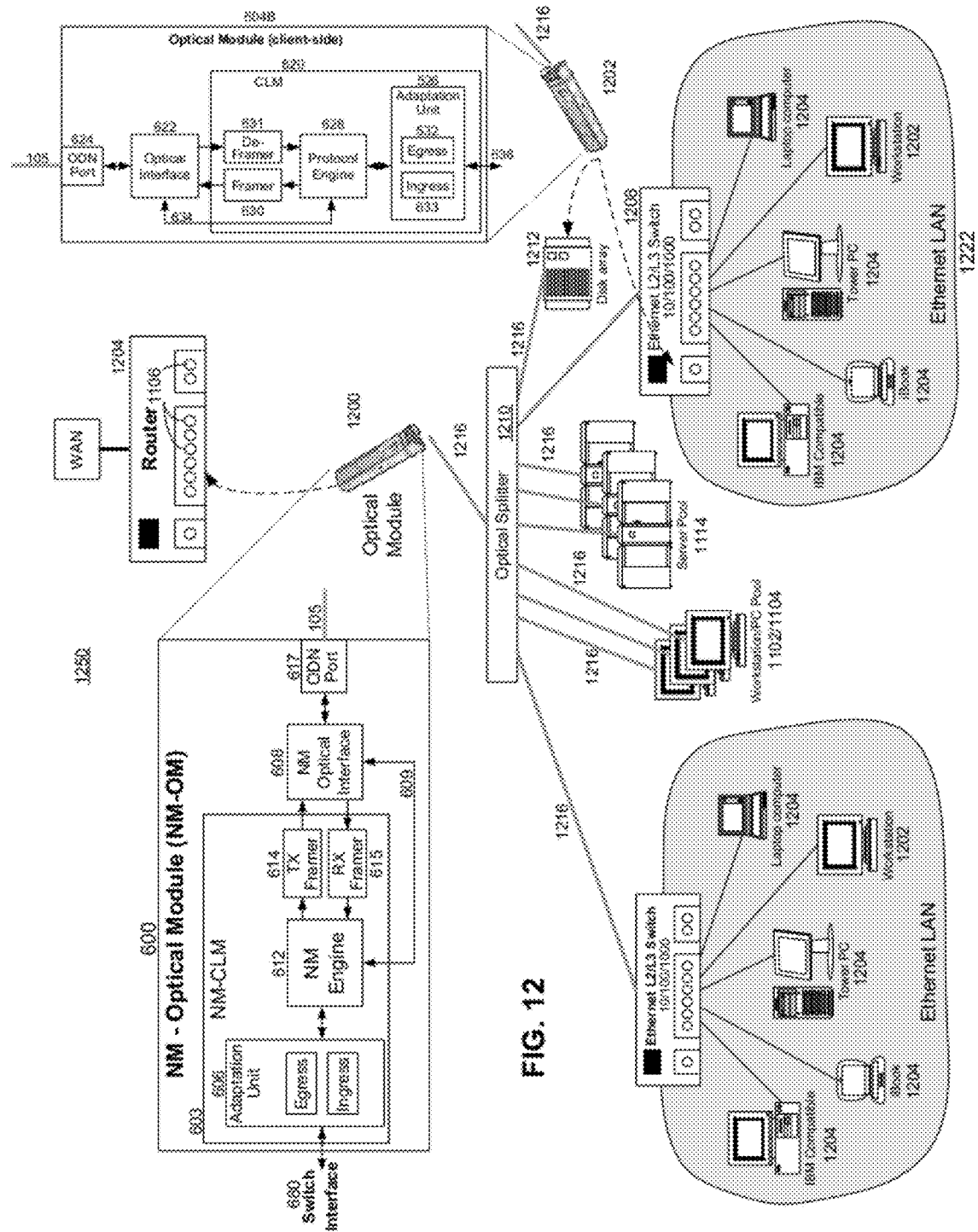
FIG. 12 is an illustration of an exemplary passive optical local area network with optical transceiver modules in accordance with an embodiment of the present invention.

Referring now to FIG. 12 in view of FIG. 6, an exemplary embodiment of passive optical network 650 is shown as an implementation of an optical local area network 1250. A head-end optical module (HE-OM) 1200 is provided that, in one embodiment, conforms to an industry standard Multi-source agreement (MSA) form factor (e.g., 300pin, XENPAK, X2, XPAK, XFP, SFP, SFP+, C from factor pluggable (CFP), compact small form factor pluggable (C-SFP), quad small form factor pluggable (QSFP), QFSP+, etc.). A network client optical module (NC-OM) 1202 can be provided that, in one embodiment, also conforms to an industry standard MSA form factor (e.g., 300pin, XENPAK, X2, XPAK, XFP, SFP, SFP+, CPF, C-SFP, QSFP, QSFP+, etc.). Pluggable form factors are the preferred form factors for their ease of installation and potential replacement. It will be appreciated that some network embodiments in accordance with the invention can utilize a head-end optical module (HE-OM) and other network embodiments can utilize network client optical modules (NC-OM) and still some further network embodiments can utilized both head-end and client optical modules in the same network embodiment.

The HE-OM 1200 can be plugged into and connect to a router 1204 that has optical module ports 1206 using the router's switch interface (e.g., XAUI or Serial). The HE-OM 1200 is in optical communication with an optical splitter 1210 that splits light among and collects light from workstations 1202, PCs 1204, disk storage array devices 1212, servers 1214 over optical fibers 1216 and switches using appropriate NICs and/or NC-OM 1202 as previously described. The Ethernet Layer-2/3 switch 1208 can be of conventional design and include an uplink port, which in one embodiment, accepts industry standard optical module form factors and can accept an NC-OM 1202. Thus Ethernet Layer-2/3 switch 1208 can communicate with the HE-OM 1200 in router 1204 by using an NC-OM 1202 via network interface 636 (e.g., XAUI or Serial). Some of the advantages of the invention in a local area network are a reduction in the number of switches, a reduction in the power consumed by the network and an increase the span or physical reach of the network to support and connect a given number of clients.

Figure 13:
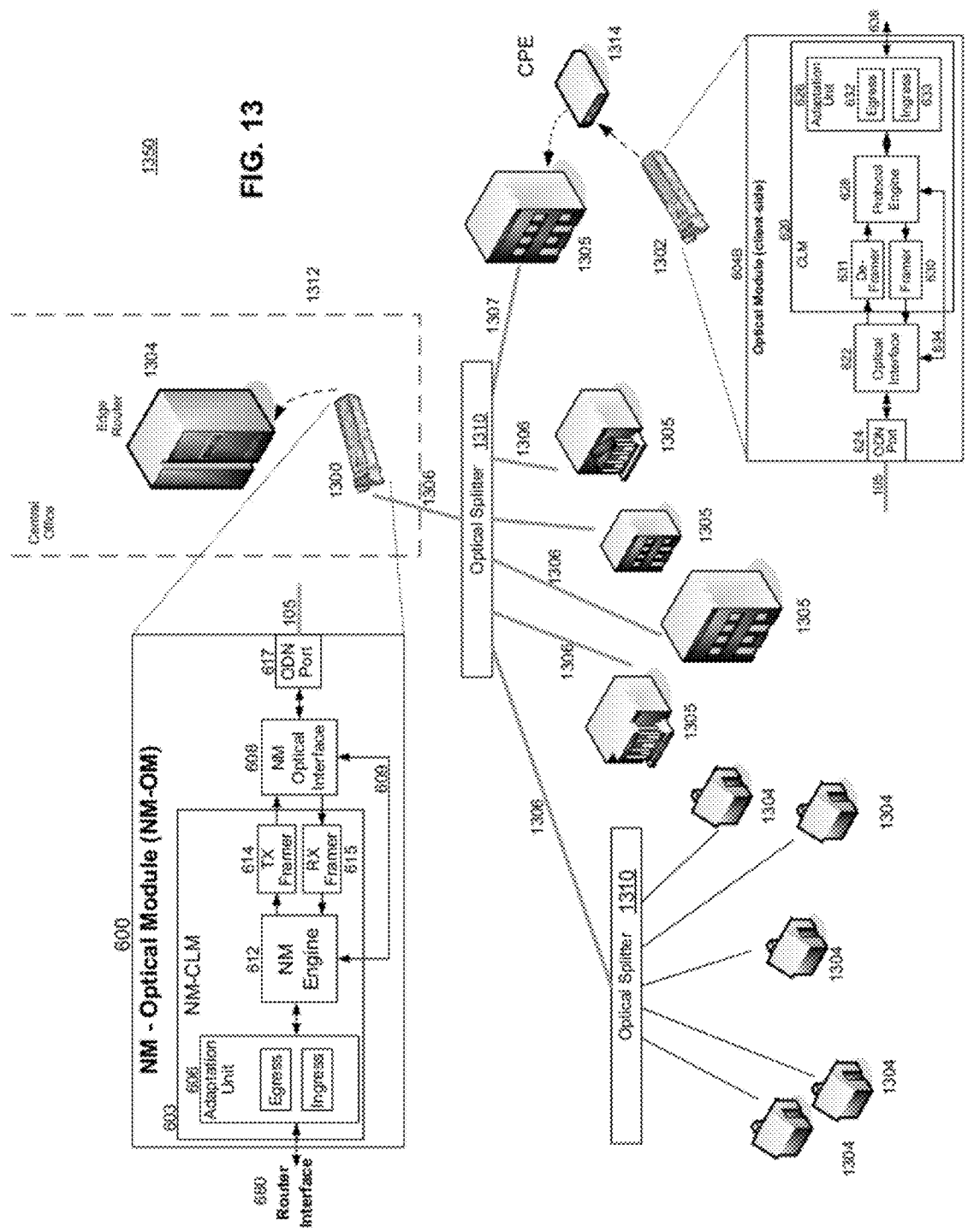
FIG. 13 is an illustration of an exemplary broadband access passive optical network with optical transceiver modules in accordance with an embodiment of the present invention.

Referring now to FIG. 13 in view of FIGS. 5 and 6, an exemplary embodiment of passive optical network 650 is shown as an exemplary embodiment of a broadband access passive optical network 1350. A head-end optical module (HE-OM) 1300 is provided that is capable of operating as the OLT 550 and, in one embodiment, conforms to an industry standard Multi-source agreement (MSA) form factor (e.g., 300pin, XENPAK, X2, XPAK, XFP, SFP, SFP+, CFP, C-SFP, QSFP, QSFP+, etc.). Typically an OLT 550 resides at a central office 1312 of a service provider. A network client optical module (NC-OM) 1302 can be provided that is capable of operating as an ONU/ONT 555,560 and, in one embodiment, also conforms to an industry standard MSA form factor (e.g., 300pin, XENPAK, X2, XPAK, XFP, SFP, SFP+, CFP, C-SFP, QSFP, QSFP+, etc.). Again, pluggable form factors are the preferred form factors for their ease of installation and potential replacement.

The HE-OM 1300 can be plugged into and connect to an Edge Router 1304 that has optical module ports. The HE-OM 1300 is in optical communication with an optical splitter 1310 that splits light among and collects light from ONUs/ONTs located at residential homes 1304 or buildings 1305 over optical fibers 1306. The ONUs/ONTs can be located at remote nodes, field cabinets, wireless or cellular towers, or network demarcation point (e.g., network interface device (NID)) depending on the type of broadband access PON (e.g., FTTN, FTTC, FTTP, wireless backhaul, etc) and can utilize an NC-OM 1302, though not necessarily as HE-OM 1200 (i.e., the OLT) is envisioned to be interoperable with other ONUs/ONTs across the industry regardless of vendor. Additionally, in one embodiment, a customer premise equipment (CPE) device 1314 is shown located at a building 1305 in which optical fiber 1307 as been brought into the building and an NC-OM 1302 (i.e, as an ONU/ONT) is utilized to communicate with HE-OM 1300 (i.e., the OLT). The CPE 1314 can be an Ethernet switch or media converter. The advantage of the invention in a broadband access PON is a reduction in the number of switches, a reduction in the installation time and labor, and a reduction in the power consumed by the network to support and connect a given number of clients.

Figure 14:
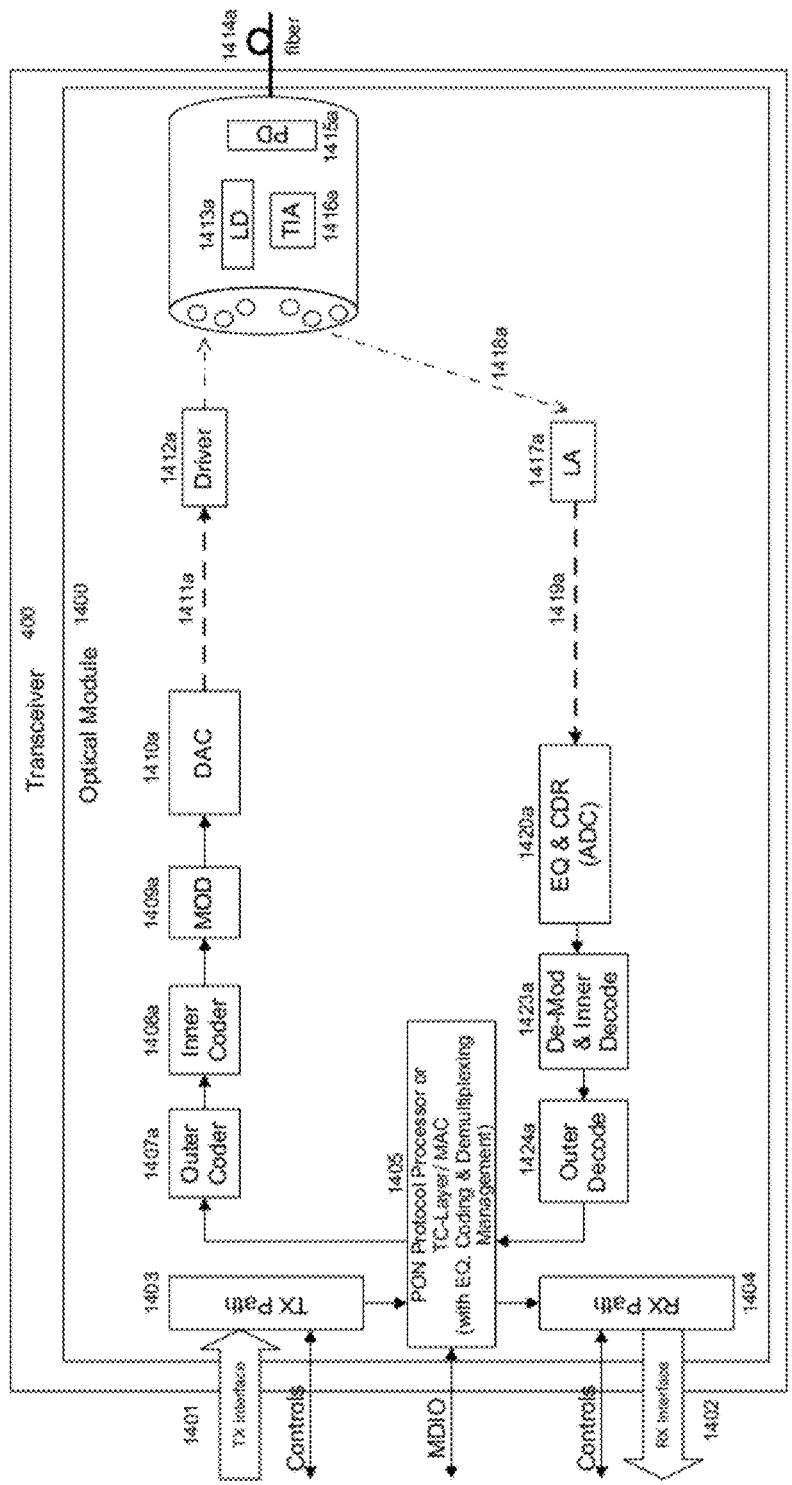
FIG. 14 is an illustration of an exemplary embodiment of an optical module capable of m-ary modulation in accordance with an embodiment of the present invention.

Referring now to FIG. 14 in view of FIG. 4, an additional exemplary embodiment of an optical module 1400 is illustrated. The following is a description of the functions and responsibilities that are part of an embodiment of the Communication Logic & Memory 431 of transceiver 400 of FIG. 4. The Communication Logic & Memory 431 includes an asynchronous or synchronous system transmit (TX) interface 1401 and receive (RX) interface 1402 that is supported by the TX Path 1403 and RX Path 1404 blocks. System interfaces 1401,1402 and management or control interfaces can be selected from interfaces including serial, serial XFI, parallel, GMII, XGMII, SGMII, RGMII or XAUI or some other interface can be used. TX Path 1403 and RX Path 1404 blocks manage the TX and RX interfaces 1401, 1402 and feed data into and get data from the PON protocol processor, transmission convergence layer or media access control (TC-Layer/MAC) block 1405. TX Path 1403 and RX Path 1404 blocks can perform line code adaptation functions (e.g., line coding used outside the transceiver can be terminated by a TX Path block 1403 or sourced by a RX Path block 1404 to allow a bit stream, cell, frame, and/or packet formatted data to be adapted for processing by a PON protocol processor or TC-Layer/MAC block 1405). The PON protocol processor or TC-Layer/MAC 1405 block creates the transport system that the data traffic, management and control agents will exploit. PON protocol processor or TC-Layer/MAC 1405 block includes a TC-layer protocol stack such as specified in the ITU G.984 specification (incorporated herein by reference), IEEE 802.3ah MAC protocol stack specification (incorporated herein by reference) or a derivative thereof. A variety of other protocol stacks are envisioned that can also be used. The PON protocol processor or TC-Layer/MAC 1405 block can perform the additional functions of equalizer, coding, queue and demultiplexing management. The PON protocol processor or TC-Layer/MAC 1405 block has both transmit and receive paths.

In a transmit path, the transmit data is provided to the outer coder 1407a block. In one embodiment, outer coder 1407a performs a reed-solomon coding. The outer coder 1407a block provides data to the inner coder 1408a block. In order to improve the energy per bit required to deliver the transmitting data, an inner coder 1408a is used. Outer coder 1407a can be used to support forward error correction (FEC) recovery of bit(s) errors. In one embodiment, inner coder 1408a implements a trellis coding method. Data from the inner coder 1408a is provided to Modulation (MOD) 1409a block. Alternatively, in one embodiment, the outer coder 1407a and inner coder 1408a blocks are not used, and the output of the PON protocol processor or TC-Layer/MAC 1405 is provided directly to the MOD 1409a block. Other outer coding methods that work on bit or symbol streams of arbitrary length can be used, for example linear block codes such as Low-density parity-check (LDPC) and convolutional codes such as Turbo code can be used. Other inner coding methods that are complementary to the outer code as well as inner coding methods that are designed to shape or control the relative intensity noise (RIN) of the optical transmitter to improve overall system performance can be used. For example, an inner coder that dynamically adapts to measured RIN or compensates for measured temperature or other artifacts of laser design can be used.

To increase the number of bits per symbol transmitted, m-ary modulation is performed in the MOD 1409a block. In one embodiment, an m-ary modulation method such as Quadrature Amplitude Modulation (QAM), QAM-32, QAM-256, Pulse Amplitude Modulation (PAM), PAM-4, PAM-5, PAM-16, PAM-17, Quadrature Phase Shift Keying (QPSK), differential QPSK (DQPSK), return-to-zero QPSK (RZ-QPSK), dual-polarized QPSK (DP-QPSK), or Orthogonal Frequency Division Multiplexing (OFDM) is used. Other m-ary modulation communication methods can be used, in particular other coherent modulation techniques which are known in the art. After processing by the MOD 1409a block, the transmit data is converted to an analog signal by a Digital to Analog Converter (DAC) 1410a. In one embodiment, DAC 1410a is configured to shape, condition or emphasize the signal for improved transmission performance. The DAC 1410a passes the transmit data via electrical signals 1411a to the laser driver (Driver) 1412a as part of an embodiment of TX 434,435 in an Optical Module 1426. The driver 1412a drives an optical transmitter, such as the Laser Diode (LD) 1413a which transmits light in response to transmit data signals received from the driver 1412a. The light emitted from LD 1413a is directed into the fibers 1414a with the aid of a fiber optic interface (not shown). The fiber optic interface can include the necessary components (e.g., filters) to implement WDM, CWDM or DWDM functions.

In the receive path, as part of an embodiment of RX 433, 436 in an Optical Module 1426, light from a complementary optical transmitter as discussed above propagated across an ODN (not shown in FIG. 14) travels over optical fiber 1414a through a fiber optic interface (not shown) and is received by an optical detector, such as the photo diode (PD) 1415a. In response, the PD 1415a provides a photocurrent to the TransImpedance Amplifier (TIA) 1416a that converts the photocurrent into an electrical voltage signal. The electrical voltage signal from the TIA 1416a is then transmitted to a Linear Amplifier (LA) 1417a as a differential signal or a single-ended signal 1418a. The LA 1417a performs signal conditioning on the received electrical voltage signal to provide increased resolution and system performance. The LA 1417a provides an electrical signal 1419a to an Equalization (EQ) and Clock Data Recovery (CDR) 1420a, block that performs equalization on the received data and recovers clock and data signals which is then provided to a De-Mod & Inner Decoder 1423a. The EQ & CDR 1420a block can implement a blind equalization method or decision-directed equalization method. Blind equalization is an equalization method that does not use a predetermined sequence of symbols that are transmitted for the sole purpose of equalizing the communication channel. Other equalization methods can be used, particularly those that aid the CDR. It will be appreciated that the combination of EQ and CDR functions also perform analog digital converter (ADC) function. The De-Mod & Inner Decoder 1423a block performs complementary de-modulation to the m-ary modulation performed in the MOD 1409a block as well as a complementary decoding method to the coding method performed in the Inner Coder 1408a block. In one embodiment, De-Mod & Inner Decoder 1423a includes a Viterbi decoder. Other decoding means can be used. Received data is then provided to the outer decoder 1424a block, which performs a complementary decode to the error detection and/or recovery method chosen in the outer coder 1407a block. After demodulation and decoding, the received data is then provided to the PON protocol processor or TC-Layer/MAC 1405. In embodiments without Outer Coder 1407a and Inner Coder 1408a blocks, the output of the EQ & CDR 1420a block is provided directly to the PON protocol processor or TC-Layer/MAC 1405 block.

Figure 15:
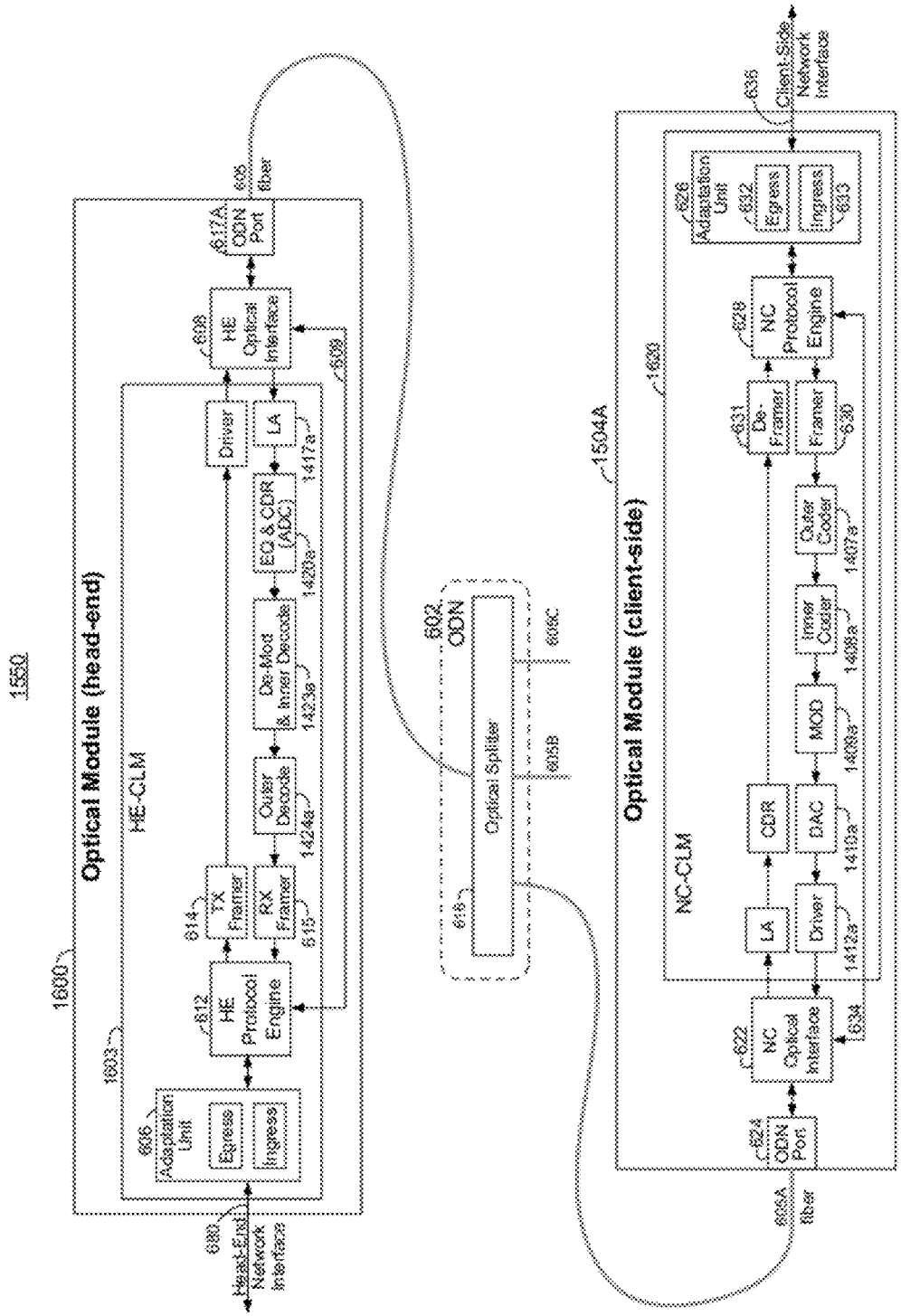
FIG. 15 is an illustration of an exemplary embodiment of optical transceiver modules capable of m-ary modulation in the upstream communications in accordance with an embodiment of the present invention

Referring now to FIG. 15, in view of FIG. 14 and FIG. 6, an additional exemplary embodiment of a head-end optical module 1500 and a network client optical module 1504A is illustrated. In this embodiment in accordance with the present invention m-ary modulation is only being performed on upstream communications. Downstream communications use binary modulation (e.g., non-return to zero NRZ). In alternative embodiments in accordance with the present invention upstream communications use binary communications and the downstream performs m-ary modulation. The previously mentioned embodiments can also perform inner and out coders to improve transmission gain and reduce transmission errors as previously discussed (e.g., using LDPC and Viterbi decoding).

Figure 16:
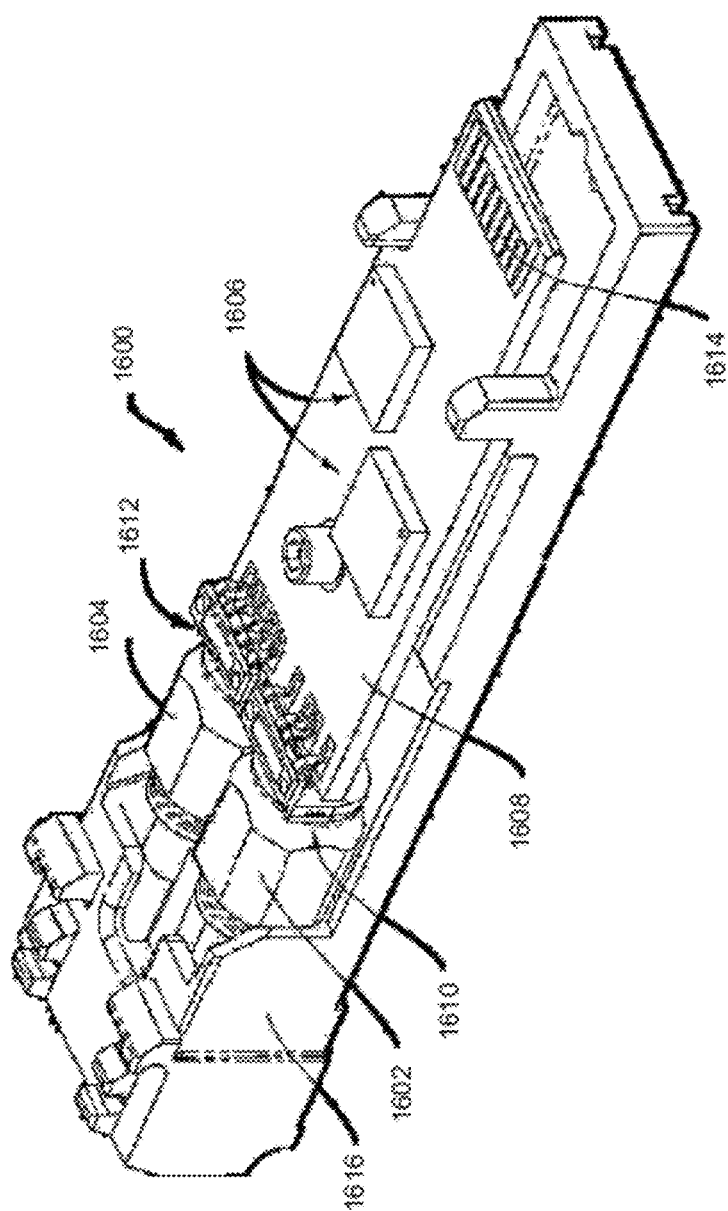
FIG. 16 is a 3D perspective view of an exemplary embodiment of an optical transceiver module in accordance with an embodiment of the present invention.

Referring now to FIG. 16 in view of FIG. 4, a 3-D perspective view of an optical module in accordance with an embodiment of the present invention is illustrated. Optical module 1600 includes various components, including an optical receiver (e.g., RX 433,436 of FIG. 4) implemented as a ROSA 1602, an optical transmitter (e.g., TX 434,435 of FIG. 4) implemented as a TOSA 1604, various electronic components (e.g., communication logic and memory 431, 432 in FIG. 4) 1606, a printed circuit board ("PCB") 1608, electrical interfaces 1610 that electrically connect the ROSA 1602 and TOSA 1604 to conductive pads 1612 on the PCB 1608, and various electrical interfaces 1514 (e.g., clock and data interfaces 415-430 of FIG. 4). Optical module 1600 also includes a housing or shell to house 1616 the above components (not completely shown), as well as aid in connecting external connectors to the ROSA 1602 and TOSA 1604.

Figure 17:
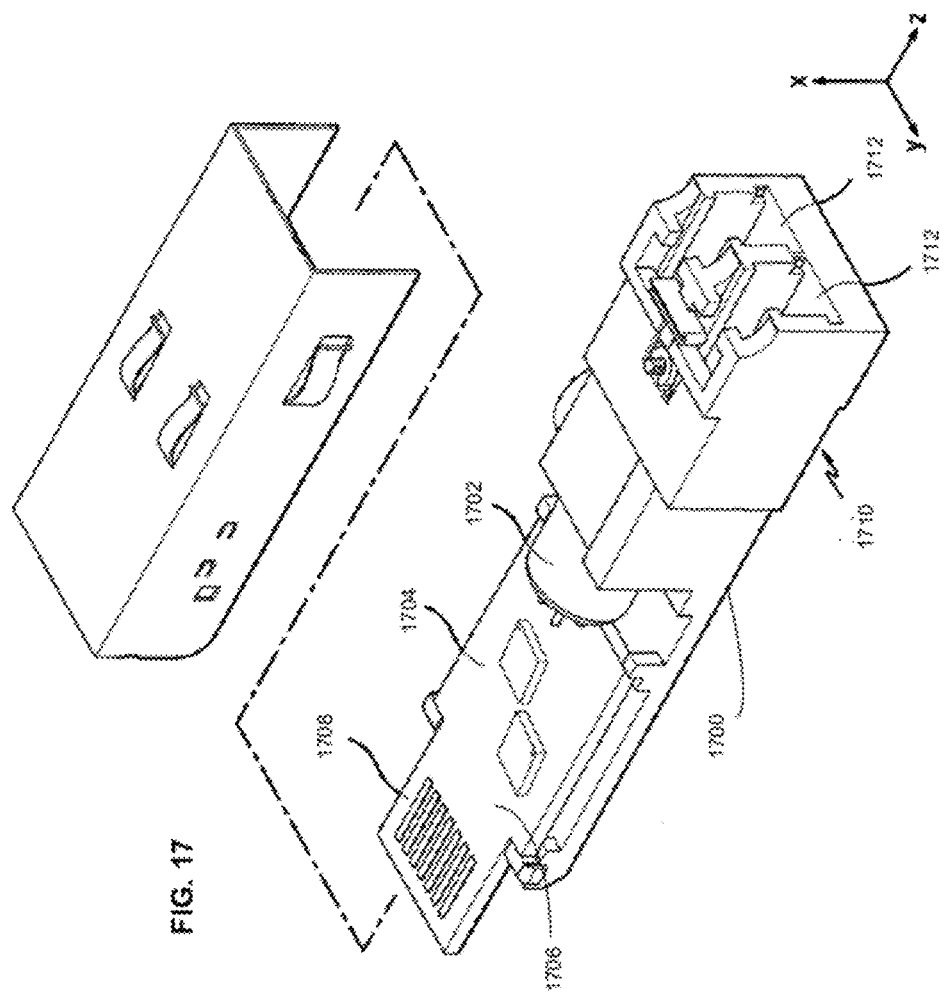
FIG. 17 is a 3D perspective view of an exemplary embodiment of an optical transceiver module in accordance with an embodiment of the present invention

Referring now to FIG. 17 in view of FIG. 4 and FIG. 16, a 3-D perspective view of an optical module in accordance with an embodiment of the present invention is illustrated. Optical module 1700 includes various components, including an optical transmitter (e.g., TX 434,435 of FIG. 5) and receiver (e.g., RX 433,436 of FIG. 4) implemented as a BOSA 1702, various electronic components (e.g., communication logic and memory 431,432 in FIG. 4) 1704 on the PCB 1706, electrical interface 1708 (e.g., clock and data interfaces 415,430 of FIG. 4). Optical module 1700 also includes a house or shell to house 1710 the above components as well as aid in connecting external connectors via 1712 to the BOSA 1702.

Referring now back to FIG. 6, it will be appreciated that in some embodiments in accordance with the invention the adaptation units 606,626 can be Ethernet media access control (MAC) devices thereby enabling communications between the HE Protocol Engine 612 and NC Protocol Engine 628 using Ethernet protocols. Example Ethernet protocols are but not limited to and herein incorporated by reference include: IEEE 802.3 10BaseT; IEEE 802.3 100BaseT; IEEE 802.3 1000BaseT, and IEEE 802.3 10GBaseT. Example Ethernet MACs are but not limited to include: 10Mbit Ethernet MAC; 100Mbit Ethernet MAC; 1Gigabit Ethernet MAC; 10Gigabit Ethernet MAC, and 100Gigabit Ethernet MAC.

It will be appreciated that encapsulation and de-encapsulation (depending on direction of flow of data) user data (i.e., data intended for application layer entities in accordance with the OSI model) is needed between adaptation units 606,626 and the HE Protocol Engine 612 and NC Protocol Engine 628 since the network communication protocol used to communicate to the host device (i.e., switch, router or media converter) and the network communication protocol used to communicate over the PON are not the same. For example an exemplary embodiment of an ONU in accordance with the invention comprises an Ethernet MAC as an embodiment of adaptation unit 626 and a GPON PON protocol processor as an embodiment of NC Protocol Engine 628, framer 630 and deframer 631. User data or payload data received from a switch or media converter that the PON optical transceiver module is removably coupled into will be in Ethernet format. The Ethernet MAC will de-encapsulate the user data and provide the user data to the GPON PON protocol processor that in turn will encapsulate the user data into a GPON frame. Similarly for the flow of data in the opposite direction, user data or payload data received optically over an optical fiber of the PON will be in a GPON format. The GPON PON protocol processor will de-encapsulate this user data from the GPON frame (assuming the data is address to this ONU) and provide the data to the Ethernet MAC that in turn will encapsulate the user data into an Ethernet frame which is then provided to the switch or media converter.

It will be appreciated that PON optical transceiver module embodiments in accordance with the invention can have external visual indicators such as light emitting diodes (LEDs) are used to indicate one or more of the following: power status; connection status of optical communications (e.g., status of optical communications such as GPON or EPON, and connection status of electrical communication (e.g., status of Ethernet communications).

It will be appreciated that a host device for the PON optical transceiver module embodiments in accordance with the invention such as a media converter (or switch or router) can offer one or more Ethernet or Voice over IP (VoIP) connections. For example, a media converter can have one or more RJ45 sockets (or plugs) and RJ11 sockets (or plugs) in addition to a power plug to supply power to the PON optical transceiver module.

It will be appreciated that in an embodiment of an ONU/ONT PON optical transceiver module in accordance with the invention can have a network interface port that comprises an RJ45 socket (or plug in an alternative embodiment). This ONU optical transceiver module can have relative form factor of an SFP or XFP however with an RJ45 socket for Ethernet communications.

It will be appreciated that will not explicitly disclosed in previous figures or discussions on embodiments of the invention, embodiments of optical transceiver modules in accordance with the invention may also measure the operating temperature of the optical transmitter as well as the received optical power of the optical receiver. These measurements can, in some embodiments of the invention, be conveyed in-band to the switch, router or media converter (e.g., using Ethernet communications). It will also be appreciated that in some embodiments in accordance with the invention of the optical transceiver module using in-band communications for diagnostics reporting (e.g., temperature, optical receive power) can make electrical interface connections (e.g., pin signal interfaces) typically used for I$^2$C bus that are available in some MSA form factors available for other uses such as additional power and ground connections or additional thermal transfer connections.

It will be appreciated that in further alternative embodiments in accordance with the invention, PON optical transceiver modules, or more specifically PON protocol processors, can perform additional functions beyond those performed at the data link layer or layer-2 protocol in the OSI model. These additional functions include but are not limited to: deep packet inspection; network address translation, and additional encryption key management beyond that performed at layer-2.

It will be appreciated that the invention enables new levels of network configuration and deployment as well as cost reduction in the form of consolidation of network equipment.

Although the invention has been described in terms of particular implementations, one of ordinary skill in the art, in light of this teaching, can generate additional implementations and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An integrated pluggable Passive Optical Network (PON) optical transceiver module adapted to process and perform PON data link layer communications and functions and configured to removably couple to an optical module port of a switch, router or media adapter and adapted to communicate with the switch, router or media adapter using an Ethernet protocol, the PON optical transceiver module comprising:
    a PON protocol processor for managing the transmission and reception of data link layer optical network communications including performing one or more of the following functions comprising: encapsulating user data into data link layer frames; frame synchronization; forward error correction; physical layer addressing; data packet queuing, and operation administration and maintenance (OAM) message processing;
    an optical fiber interface port disposed to removably couple an optical fiber to the PON optical transceiver module;
    an electrical network interface port disposed for electrically coupling the PON optical transceiver module in a pluggable manner to a switch, router or media converter and for receiving and transmitting Ethernet electrical signals to the switch, router or media converter;
    a bidirectional optical assembly optically coupled to the optical fiber interface port and electrically coupled to the PON protocol processor and disposed for transmitting optical signals through the optical fiber interface port responsive to electrical signals received from the PON protocol processor and disposed to conveying an electrical communication signal to the PON protocol processor responsive to receiving an optical communication signal through the optical fiber interface port;
    an Ethernet MAC electrically coupled to the PON protocol processor and electrically coupled to the electrical network interface, the Ethernet MAC disposed to enable communications between the PON protocol processor and the switch, router or media converter using an Ethernet protocol, whereby
    the PON optical transceiver module is disposed to manage the PON data link layer optical network data communications, and communicate with a switch, router or media converter using an Ethernet protocol.

2. The PON optical transceiver module of claim 1, wherein the PON optical transceiver module conforms to a Multi-Source Agreement (MSA) optical module form factor selected from the group consisting essentially of:
    Small Form-factor Pluggable (SFP);
    SFP+;
    Compact small form-factor pluggable (C-SFP);
    10 Gigabit Small Form-factor Pluggable (XFP);
    C Form-factor Pluggable (CFP);
    Quad Small Form Factor Pluggable (QSFP);
    QSFP+;
    XENPAK;
    X2;
    XPAK; and
    300pin.

3. The PON optical transceiver module of claim 1, wherein the PON protocol processor performs functions conforming to a network protocol selected from the group consisting essentially of:
    ITU-T G.984 Gigabit PON (GPON);
    IEEE 802.3ah Ethernet PON (EPON);
    ITU-T G.987 10 Gigabit PON (XG-PON);
    IEEE 802.3av 10 Gigabit Ethernet PON (10G-EPON);
    ITU Next Generation PON (NG-PON);
    ITU NG-PON2;
    WDM-PON;
    ITU-T G.983 Broadband Passive Optical Network (BPON);
    Data over Cable Service Interface Specification (DOCSIS) PON (D-PON/DPON); and
    RFoG SCTE IPS910.

4. The PON optical transceiver module of claim 1, wherein the PON optical transceiver module is an Optical Line Terminal (OLT) and configuration of the OLT for provisioning service level agreements (SLAs) is performed in-band over the Ethernet communications between the PON optical transceiver module and the switch, router, or media converter.

5. The PON optical transceiver module of claim 1, wherein visual indicators are used to indicate one or more of the following:
    power status;
    connection status of optical communications; and
    connection status of electrical communication.

6. The PON optical transceiver module of claim 1, wherein the PON optical transceiver module is an Optical Network Unit (ONU) or Optical Network Terminal (ONT).

7. The PON optical transceiver module of claim 1, wherein the PON protocol processor is adapted to perform one or more of the following functions:
    deep packet inspection;
    network address translation; and
    encryption key management.

8. The PON optical transceiver module of claim 1, wherein diagnostic measurements performed within the PON optical transceiver module and conveyed in-band to the switch, router or media converter through Ethernet communications includes one or more of the following measurements:
    temperature in the optical assembly;
    optical power output of the optical assembly; and
    received optical power sensitivity of the optical assembly.

9. The PON optical transceiver module of claim 1, wherein the optical fiber interface port includes one or more optical fiber connectors and the optical fiber connectors are selected from the group consisting essentially of:
    Subscriber Connector (SC);
    Lucent Connector (LC);
    Fiber Channel (FC);
    Straight TP (ST); and
    Miniature Unit (MU).

10. The PON optical transceiver module of claim 1, wherein the Ethernet MAC is selected from the group consisting essentially of:
    10Mbit Ethernet MAC;
    100Mbit Ethernet MAC;
    1Gigabit Ethernet MAC;
    10Gigabit Ethernet MAC; and
    100Gigabit Ethernet MAC.

11. The PON optical transceiver module of claim 1, wherein the PON optical transceiver module further comprises a modulation assembly electrically coupled between the PON protocol processor and the bidirectional optical assembly, the modulation assembly communicating with the PON protocol processor using binary communications and the modulation assembly communicating with the bidirectional optical assembly using m-ary communications wherein the m-ary communication is selected from the group consisting essentially of:

Quadrature Amplitude Modulation (QAM);
QAM-32, QAM-256;
Pulse Amplitude Modulation (PAM);
PAM-4;
PAM-5;
PAM-16;
PAM-17;
Quadrature Phase Shift Keying (QPSK);
Differential QPSK (DQPSK);
return-to-zero QPSK (RZ-QPSK);
dual-polarized QPSK (DP-QPSK); and
Orthogonal Frequency Division Multiplexing (OFDM).

12. The PON optical transceiver module of claim 11, wherein the modulation assembly further includes one or more of the following functions:

blind equalization;
shaping, conditioning or emphasizing data for improved transmission performance;
trellis encoding or decoding;
encoding or decoding data to compensate for the relative noise intensity (RIN) of the optical assembly to improve performance; and
forward error correction.

13. The PON optical transceiver module of claim 1, wherein the PON optical transceiver module is configured to monitor alarms and diagnostics and reporting of the alarms or diagnostics are performed in-band over the Ethernet communications between the PON optical transceiver module and the switch, router or media converter.

14. The PON optical transceiver module of claim 1, wherein the electrical network interface port includes an RJ45 socket or plug.

15. A Passive Optical Network (PON) optical transceiver module for a passive optical network, the PON optical transceiver module having a pluggable form factor and adapted to removably couple to an optical module port of a switch, router or media converter, and the PON optical transceiver module having an optical interface port for coupling to one or more optical fibers of the passive optical network, and the PON optical transceiver module having a bidirectional optical assembly optically coupled to the optical port and for converting electrical signals to optical signals and for converting optical signals to electrical signals, and the PON optical transceiver module having a PON protocol processor electrically coupled to the bidirectional optical assembly and for processing and performing optical data link layer network communications, and the PON optical transceiver module having an Ethernet media access controller (MAC) electrically coupled to the PON protocol processor and the PON optical transceiver module having an electrical network interface port electrically coupled to the Ethernet MAC and for electrically communicating to the switch or router, a method of communicating on a passive optical network from the PON optical transceiver module comprising the steps of:

(a) receiving a first optical signal through the optical interface port at the bidirectional optical assembly of the PON optical transceiver module;
(b) converting the first optical signal to an electrical signal at the bidirectional optical assembly and conveying the electrical signal to the PON protocol processor of the PON optical transceiver module;
(c) processing the electrical signal at the PON protocol processor to determine a first optical data link layer frame and de-encapsulating a first user payload data from the first optical data link layer frame;
(d) conveying the first user payload data from the PON protocol processor to the Ethernet MAC;
(e) encapsulating the first user payload data in a first Ethernet data frame by the Ethernet MAC and conveying the first Ethernet data frame to the switch, router or media converter through the electrical network interface port;
(f) receiving a second Ethernet data frame from the switch, router or media converter through the electrical network interface port of the PON optical transceiver module;
(g) de-encapsulating a second user payload data from the second Ethernet data frame by the Ethernet MAC;
(h) conveying the second user payload data from the Ethernet MAC to the PON protocol processor;
(i) encapsulating the second user payload data into a second optical data link layer frame by the PON protocol processor;
(j) converting the second optical data link layer frame to a second optical signal; and
(k) transmitting the second optical signal from the bidirectional optical assembly through the optical interface port; whereby the PON optical transceiver module is disposed to optically communicate user data over the passive optical network and is disposed to electrically communicate user data with the switch, router or media converter using Ethernet communications.

16. The method of claim 15, wherein the PON optical transceiver module conforms to a Multi-Source Agreement (MSA) optical module form factor selected from the group consisting essentially of:

Small Form-factor Pluggable (SFP);
SFP+;
Compact small form-factor pluggable (C-SFP);
10 Gigabit Small Form-factor Pluggable (XFP);
C Form-factor Pluggable (CFP);
Quad Small Form Factor Pluggable (QSFP);
QSFP+;
XENPAK;
X2;
XPAK; and
300pin.

17. The method of claim 15, wherein the PON protocol processor performs functions conforming to a network protocol selected from the group consisting essentially of:

ITU-T G.984 Gigabit PON (GPON);
IEEE 802.3ah Ethernet PON (EPON);
ITU-T G.987 10 Gigabit PON (XG-PON);
IEEE 802.3av 10 Gigabit Ethernet PON (10G-EPON);
ITU Next Generation PON (NG-PON);
ITU NG-PON2;
WDM-PON;
ITU-T G.983 Broadband Passive Optical Network (BPON);
Data over Cable Service Interface Specification (DOCSIS) PON (D-PON/DPON); and
RFoG SCTE IPS910.

18. The method of claim 15, wherein the PON optical transceiver module is an Optical Line Terminal (OLT) and configuration of the OLT for provisioning service level agreements (SLAs) is performed in-band over the Ethernet communications between the PON optical transceiver and the switch, router, or media converter.

19. The method of claim 15, wherein the PON optical transceiver module is an Optical Network Unit (ONU) or Optical Network Terminal (ONT).

20. The method of claim 15, wherein diagnostic measurements performed within the PON optical transceiver module and conveyed in-band to the switch, router or media converter through Ethernet communications includes one or more of the following measurements:
   temperature in the optical assembly;
   optical power output of the optical assembly; and
   received optical power sensitivity of the optical assembly.

21. The method of claim 15, wherein the optical fiber interface port includes one or more optical fiber connectors and the optical fiber connectors are selected from the group consisting essentially of:
   Subscriber Connector (SC);
   Lucent Connector (LC);
   Fiber Channel (FC);
   Straight TP (ST); and
   Miniature Unit (MU).)

22. The method of claim 15, wherein the PON optical transceiver module further comprises a modulation assembly electrically coupled between the PON protocol processor and the bidirectional optical assembly, the modulation assembly communicating with the PON protocol processor using binary communications and the modulation assembly communicating with the bidirectional optical assembly using m-ary communications wherein the m-ary communication is selected from the group consisting essentially of:
   Quadrature Amplitude Modulation (QAM);
   QAM-32, QAM-256;
   Pulse Amplitude Modulation (PAM);
   PAM-4;
   PAM-5;
   PAM-16;
   PAM-17;
   Quadrature Phase Shift Keying (QPSK);
   Differential QPSK (DQPSK);
   return-to-zero QPSK (RZ-QPSK);
   dual-polarized QPSK (DP-QPSK); and
   Orthogonal Frequency Division Multiplexing (OFDM).

23. The method of claim 22, wherein the modulation assembly further includes one or more of the following functions:
   blind equalization;
   shaping, conditioning or emphasizing data for improved transmission performance;
   trellis encoding or decoding;
   encoding or decoding data to compensate for the relative noise intensity (RIN) of the optical assembly to improve performance; and
   forward error correction.

24. The method of claim 15, wherein the Ethernet MAC is selected from the group consisting essentially of:
   10Mbit Ethernet MAC;
   100Mbit Ethernet MAC;
   1Gigabit Ethernet MAC;
   10Gigabit Ethernet MAC; and
   100Gigabit Ethernet MAC.

25. The method of claim 15, wherein the PON optical transceiver module is configured to monitor alarms and diagnostics and reporting of the alarms or diagnostics are performed in-band over the Ethernet communications between the PON optical transceiver module and the switch, router, or media converter.

26. The method of claim 15, wherein the electrical network interface port includes an RJ45 socket or plug.

* * * * *